(12) United States Patent
Nixon et al.

(10) Patent No.: US 7,369,575 B2
(45) Date of Patent: May 6, 2008

(54) BANDWIDTH MATCHING DEVICE AND METHOD FOR OPERATING THE SAME

(75) Inventors: Walter Nixon, Fremont, CA (US);
Whay Sing Lee, Newark, CA (US);
Fay Chong, Jr., Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 994 days.

(21) Appl. No.: 10/623,088

(22) Filed: Jul. 17, 2003

(65) Prior Publication Data

US 2005/0013323 A1 Jan. 20, 2005

(51) Int. Cl.
*H04J 3/24* (2006.01)
*H04J 3/04* (2006.01)
(52) U.S. Cl. .................... 370/474; 370/535
(58) Field of Classification Search .................. None
See application file for complete search history.

(56) References Cited

U.S. PATENT DOCUMENTS

| | | | |
|---|---|---|---|
| 6,233,255 B1* | 5/2001 | Kato et al. | 370/486 |
| 6,566,918 B1* | 5/2003 | Nguyen | 327/115 |
| 6,587,852 B1* | 7/2003 | Svingen et al. | 707/6 |
| 6,665,833 B1* | 12/2003 | Tong et al. | 714/790 |
| 2001/0007577 A1* | 7/2001 | Measor | 375/247 |
| 2001/0040903 A1* | 11/2001 | Negishi et al. | 370/537 |
| 2001/0053161 A1* | 12/2001 | Tomizawa et al. | 370/538 |
| 2002/0146023 A1* | 10/2002 | Myers | 370/412 |
| 2002/0175702 A1* | 11/2002 | Cohen | 326/37 |
| 2004/0264418 A1* | 12/2004 | Chen et al. | 370/335 |

* cited by examiner

*Primary Examiner*—Andrew C. Lee
(74) *Attorney, Agent, or Firm*—Martine Penilla & Gencarella, LLP

(57) ABSTRACT

Broadly speaking, a bandwidth matching device is provided for transforming a number of incoming data streams each having a first bandwidth into an outgoing data stream having a second bandwidth. More specifically, the bandwidth matching device provides an assembler and a disassembler. The assembler incorporates a stepped arrangement of cells for transforming the number of incoming data streams having a given bandwidth into an outgoing data stream having a larger bandwidth, wherein each portion of the outgoing data stream represents a concatenation of a number of portions of each of the incoming data streams. As a complement to the assembler, the disassembler uses a stepped arrangement of cells to transform the concatenated output generated by the assembler back into the number of incoming data streams originally received by the assembler.

22 Claims, 24 Drawing Sheets

| Clock Cycle | 0 | 1 | 2 | 3 | 4 | 5 | 6 | 7 | 8 |
|---|---|---|---|---|---|---|---|---|---|
| $S_0$ | 1 | 0 | 0 | 0 | 1 | 0 | 0 | 0 | 1 |
| $S_1$ | 0 | 1 | 0 | 0 | 0 | 1 | 0 | 0 | 0 |
| $S_2$ | 0 | 0 | 1 | 0 | 0 | 0 | 1 | 0 | 0 |
| $S_3$ | 0 | 0 | 0 | 1 | 0 | 0 | 0 | 1 | 0 |
| $S_A/S_E$ | {0001} | {0010} | {0100} | {1000} | {0001} | {0010} | {0100} | {1000} | {0001} |
| $S_B/S_F$ | {1000} | {0001} | {0010} | {0100} | {1000} | {0001} | {0010} | {0100} | {1000} |
| $S_C/S_G$ | {0100} | {1000} | {0001} | {0010} | {0100} | {1000} | {0001} | {0010} | {0100} |
| $S_D/S_H$ | {0010} | {0100} | {1000} | {0001} | {0010} | {0100} | {1000} | {0001} | {0010} |

Fig. 3

BANDWIDTH MATCHING DEVICE AND METHOD FOR OPERATING THE SAME

CROSS REFERENCE TO RELATED APPLICATIONS

This application is related to U.S. patent application Ser. No. 10/623,023, filed on even date herewith, and entitled "Efficient Utilization of Shared Buffer Memory and Method for Operating the Same," issued as U.S. Pat. No. 7,149,842. The disclosure of this related application is incorporated herein by reference.

BACKGROUND OF THE INVENTION

1. Field of the Invention

The present invention relates generally to digital data transmission, and more particularly, to a device for matching a bandwidth of one component to another component.

2. Description of the Related Art

When connecting a number of peripheral devices to a computer system, it is necessary to provide a device or method to match the bandwidth of the peripheral device to the bandwidth of the computer system. If the peripheral device operates at a lower bandwidth (e.g., smaller data path width and/or lower clock speed) than a memory of the computer system, data being transmitted from the peripheral device to the memory of the computer system need to be processed such that the data is transmitted at the bandwidth of the memory. Conversely, if data is being transmitted from the memory of the computer system to the peripheral device, processing need to be performed such that the data can be transmitted at the bandwidth of the peripheral device.

In view of the foregoing, there is a need for a device that can match the bandwidth of one component to another component and be implemented in an efficient manner.

SUMMARY OF THE INVENTION

Broadly speaking, the present invention fills these needs by providing a bandwidth matching device. More specifically, the present invention provides an assembler and a disassembler of a bandwidth matching device. The assembler transforms an incoming data stream having a given bandwidth into an outgoing data stream having a larger bandwidth. Each portion of the outgoing data stream represents a concatenation of a number of portions of the incoming data stream. The assembler is capable of simultaneously receiving and processing multiple incoming data streams. Each incoming data stream received by the assembler is sequentially presented to a stepped arrangement of cells on each cycle of a clock. When data is streaming into the assembler on all available inputs, a new concatenated output from a different incoming data stream is provided on every clock cycle. As a complement to the assembler, the disassembler transforms the concatenated output generated by the assembler back into the incoming data stream originally received by the assembler.

In one embodiment, an assembler of a bandwidth matching device is disclosed. The assembler includes a number of inputs each having a first bandwidth. A number of multiplexers are also included in the assembler. The number of multiplexers is equal to the number of inputs. Each of the multiplexers is connected to receive each of the number of inputs and a selector signal. Each of the multiplexers also has an output. The assembler further includes a number of serially connected cells connected to the output of the multiplexers. The serially connected cells form a stepped arrangement of cells for generating a concatenated output on a cycle of a clock. The concatenated output generated by the stepped arrangement of cells on each cycle of the clock represents a concatenated version of one of the number of inputs. The concatenated output generated by the stepped arrangement of cells has a second bandwidth that is larger than the first bandwidth of each of the number of inputs.

In another embodiment, a disassembler of a bandwidth matching device is disclosed. The disassembler includes an input representing a concatenation of a number of data packets. The disassembler further includes a number of cells that are each connected to receive one of the number of data packets contained within the input. Some of the number of cells are serially connected to a number of additional cells to form a stepped arrangement of cells. The stepped arrangement of cells is defined to provide each of the number of data packets in a sequenced manner. The disassembler also includes a number of multiplexers. Each of the number of multiplexers is connected to receive the number of data packets provided by the stepped arrangement of cells in the sequenced manner. Each of the number of multiplexers is also connected to receive a selector signal. In addition, each of the number of multiplexers are defined to provide an output sequence of data packets on successive cycles of a clock. The output sequence of data packets represents an unconcatenated sequence of the data packets contained within the input.

In another embodiment, a method for operating a bandwidth matching device is disclosed. The method includes receiving a number of inputs into an assembler of the bandwidth matching device. Also in the method, the number of inputs are transmitted through a stepped arrangement of cells of the assembler. The method further includes outputting sequential portions of one of the number of inputs from the stepped arrangement of cells in the form of a concatenated output.

In another embodiment, a device is disclosed. The device includes a number of inputs having a first bandwidth. The device also includes a number of multiplexers coupled to receive the number of inputs and a selector signal. The number of multiplexers is equal in number to the number of inputs. Each multiplexer also has a multiplexer output. The device further includes a number of cells coupled to receive the multiplexer outputs and a clock signal. The number of cells generate a cell output representing a concatenated version of a different one of the number of inputs in relation to a cycle of the clock signal. The cell output has a second bandwidth greater than the first bandwidth. Also, the number of cells include one or more cells coupled in series in a respective path extending from each respective multiplexer output to the cell output. Each respective path contains a number of cells that differs by one from a next sequential path.

In another embodiment, another device is disclosed. The device includes a multiplexing circuit capable of receiving a number of input signals and a selecting signal. Each of the number of input signals has a first bandwidth. The multiplexing circuit is also capable of providing a number of multiplexing output signals. The device further includes a serializing circuit coupled to receive the number of multiplexing output signals and a clock signal. In relation to a cycle of the clock signal, the serializing circuit is capable of providing a serialized output signal representing a concatenated version of a different one of the number of input signals. The serialized output signal has a second bandwidth. The device also includes one or more cells coupled in series in a respective path extending from each of the number of multiplexing output signals to the serialized output signal. Each respective path contains a number of cells that differs by one from a next sequential path.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which:

FIG. 3 is an illustration showing a table of selector signals corresponding to clock cycles 0 through 8, in accordance with the embodiment illustrated in FIGS. 1 and 2;

DETAILED DESCRIPTION

Broadly speaking, an invention is disclosed for a bandwidth matching device. More specifically, the present invention provides an assembler and a disassembler of a bandwidth matching device. The assembler transforms a number (n) of incoming data streams, each having a bandwidth (m), into an outgoing data stream having a bandwidth equal to n multiplied by m. Each portion of the outgoing data stream represents a concatenation of a number of portions of the incoming data stream. The assembler is capable of simultaneously receiving and processing multiple incoming data streams. Each incoming data stream received by the assembler is sequentially presented to a stepped arrangement of cells on each cycle of a clock. When data is streaming into the assembler on all available inputs, a new concatenated output from a different incoming data stream is provided on every clock cycle. As a complement to the assembler, the disassembler transforms the concatenated output generated by the assembler back into the incoming data stream originally received by the assembler. It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
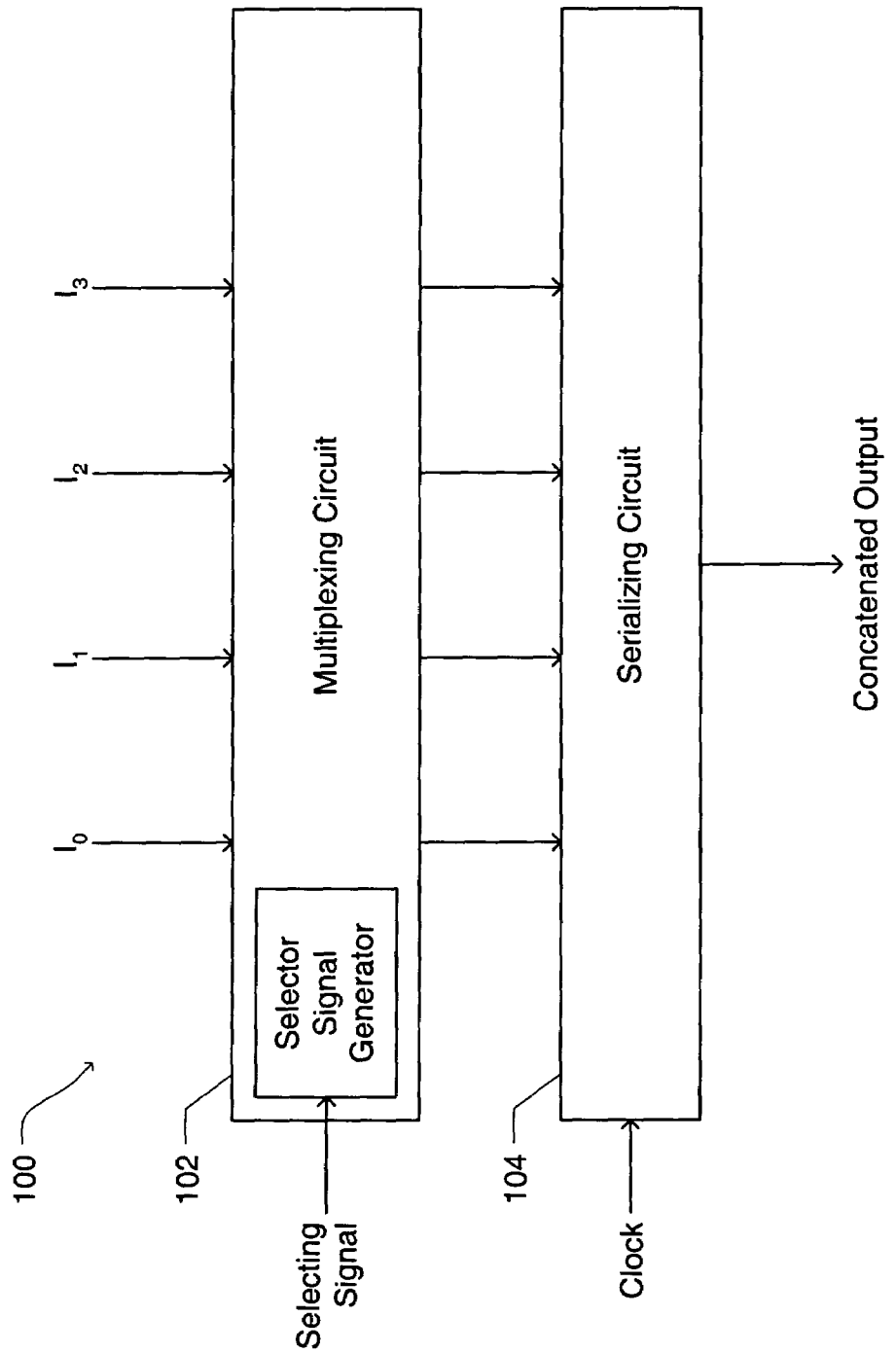
FIG. 1A is an illustration showing an assembler of a bandwidth matching device, in accordance with one embodiment of the present invention.

FIG. 1A is an illustration showing an assembler 100 of a bandwidth matching device, in accordance with one embodiment of the present invention. The assembler 100 includes a multiplexing circuit 102 and a serializing circuit 104. The multiplexing circuit 102 is defined to receive a number of input signals. In the example embodiment of FIG. 1A, the multiplexing circuit is shown to receive four input signals I0, I1, I2, and I3. It should be understood, however, that the multiplexing circuit 102 can be defined to receive any number of two or more input signals. The multiplexing circuit 102 is also shown to have a number of multiplexing output signals being provided to the serializing circuit 104. In one embodiment, the number of multiplexing output signals is equal to the number of input signals.

The multiplexing circuit 102 includes a selector signal generator for creating a selector signal to be used by the multiplexing circuit 102 for determining which of the number of input signals is to be provided as a particular multiplexing output signal. The selector signal generator is defined to receive a multiple bit selecting signal. The selector signal generator uses the multiple bits of the selecting signal to generate the selector signal to be used by the multiplexing circuit 102. In one embodiment, the number of bits in the multiple bit selecting signal is equal to the number of input signals.

The serializing circuit 104 is defined to receive the multiplexing output signals and a clock signal. The serializing circuit 104 provides a concatenated output representing a concatenated version of one of the number of input signals received by the multiplexing circuit 102. The serializing circuit 104 operates to provide a concatenated output corresponding to a different one of the number of input signals upon receipt of each clock signal. Each concatenated output represents a concatenation of a number of portions of one of the number of input signals. Therefore, each concatenated output represents a larger bandwidth version of one of the number of input signals.

Figure 1B:
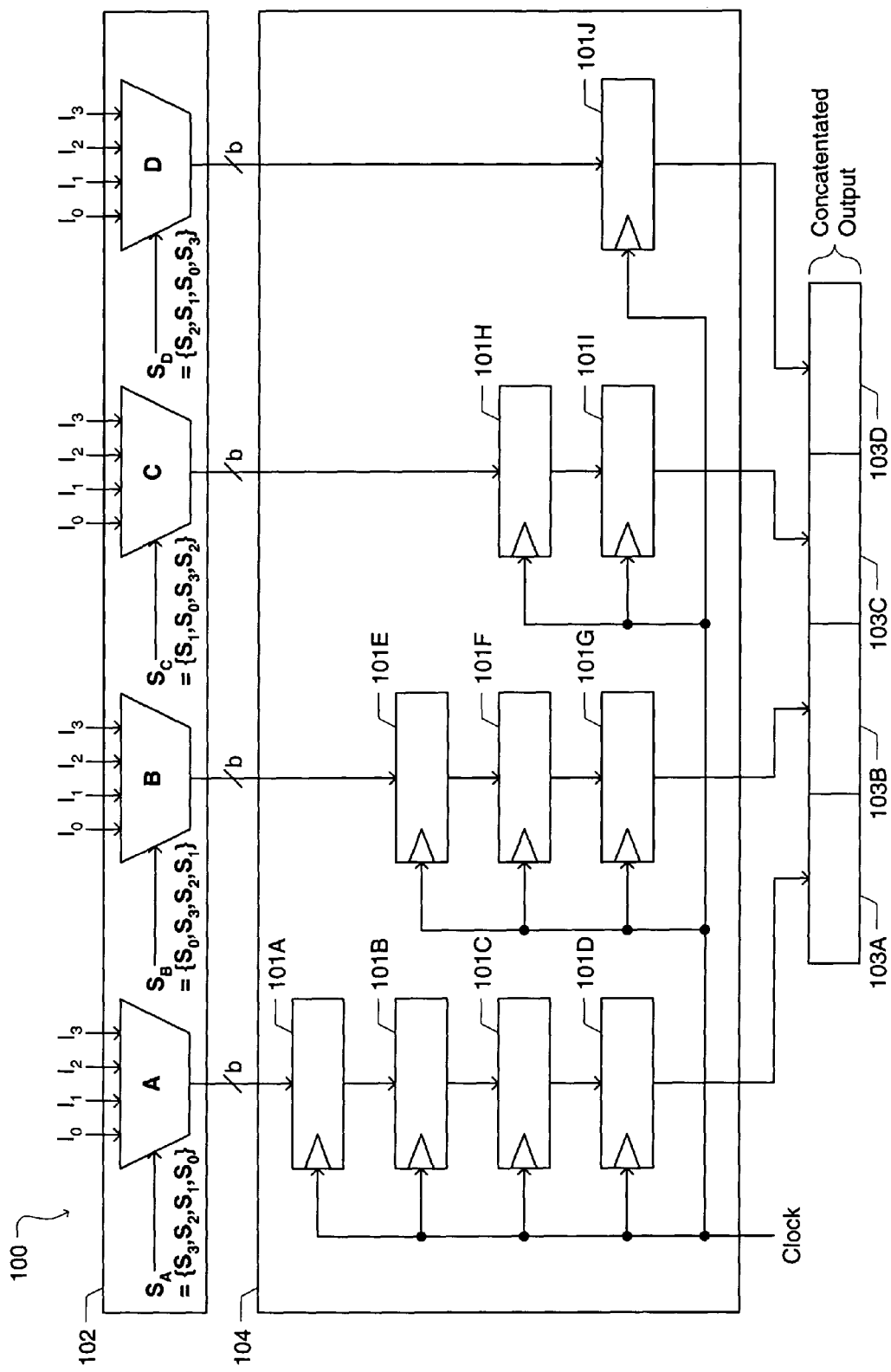
FIG. 1B is an illustration showing the assembler of the bandwidth matching device, in accordance with one embodiment of the present invention.

FIG. 1B is an illustration showing the assembler 100 of the bandwidth matching device, in accordance with one embodiment of the present invention. As discussed with respect to FIG. 1A, the assembler 100 presented in the example embodiment is capable of receiving four inputs $I_0$, $I_1$, $I_2$, and $I_3$ and providing the concatenated output. The number of inputs associated with the assembler 100 are selected for exemplary purposes. In other embodiments, the assembler 100 can include a different number of inputs. Each of the inputs $I_0$, $I_1$, $I_2$, and $I_3$ is connected to four multiplexers (MUXs) A, B, C, and D. Each MUX A, B, C, and D receives a selector signal $S_A$, $S_B$, $S_C$, and $S_D$, respectively. Also, each MUX A, B, C, and D has an output connected to a cell 101A, 101E, 101H and 101J, respectively. Each selector signal $S_A$, $S_B$, $S_C$, and $S_D$ is used to control which of the inputs $I_0$, $I_1$, $I_2$, and $I_3$ will be transmitted to the output of each of the MUXs A, B, C, and D, respectively.

A number of serially connected cells are in communication with the output of MUXs A, B, and C. The output of MUX A is connected to an input of the cell 101A. An output of the cell 101A is connected to an input of a cell 101B. An output of the cell 101B is connected to an input of a cell 101C. An output of the cell 101C is connected to an input of a cell 101D. Additionally, the output of MUX B is connected to an input of the cell 101E. An output of the cell 101E is connected to an input of a cell 101F. An output of the cell 101F is connected to an input of a cell 101G. Also, the output of MUX C is connected to an input of the cell 101H. An output of the cell 101H is connected to an input of a cell 101I. As previously mentioned, the output of MUX D is connected to an input of the cell 101J. In the aforementioned manner, the number of serially connected cells in communication with each of the MUXs A, B, and C, and the cell 101J in communication with MUX D, form a stepped arrangement of cells. In one embodiment, each of the cells 101A-101J can be an edge-triggered cell such as a flip-flop. Upon receipt of a clock signal indicating a clock cycle, each of the cells 101A-101J will change the value of its internal state (and therefore its output) to that of its current input.

Hereafter, this action will be referred to as "transmit". The outputs of cells 101D, 101G, 101I, and 101J are concatenated to form the concatenated output of the assembler 100. Thus, the concatenated output consists of four parts 103A, 103B, 103C, and 103D corresponding to the output of cells 101D, 101G, 101I, and 101J, respectively. In one embodiment, each of the four inputs $I_0$, $I_1$, $I_2$, and $I_3$ have an adequate drive capability and a sufficient setup time relative to a timing path through MUX D such that the cells 101D, 101G, 101I, and 101J are not required in the assembler 100. For completeness, however, cells 101D, 101G, 101I, and 101J will be retained in the present discussion of the assembler 100.

In the embodiment of FIG. 1B, each of the selector signals $S_A$, $S_B$, $S_C$, and $S_D$ consists of four 1-bit signals with one of the 1-bit signals having a first digital state and the remainder of the 1-bit signals having a second digital state. In one embodiment, the first digital state is a high state and the second digital state is a low state (i.e., "one hot"). In another embodiment, the first digital state is a low state and the second digital state is a high state. For purposes of discussion and illustration, the remainder of this document will consider the first digital state to be a high state and the second digital state to be a low state (i.e., "one hot"). The number of 1-bit signals in the selector signal of a particular MUX is equal to the number of inputs received by the MUX. Since each of the MUXs A, B, C, and D is configured to receive four inputs, each selector signal contains four 1-bit signals. In other embodiments, the assembler 100 may include a different number of inputs with a correspondingly different number of inputs to each MUX. In these other embodiments, the number of 1-bit signals in the selector signal of a particular MUX will continue to be equal to the number of inputs received by the MUX, with one 1-bit signal being high at a given time. In another embodiment, each of the MUXs A, B, C, and D can be something other than one-hot encoded. For example, the MUXs A, B, C, and D could have (n) control inputs encoded to select ($2^n$) inputs.

The ordering of the 1-bit signals in the selector signals vary between the MUXs. Selector signal $S_A$ for MUX A has a 1-bit signal ordering of $\{S_3, S_2, S_1, S_0\}$. Selector signal $S_B$ for MUX B has a 1-bit signal ordering of $\{S_0, S_3, S_2, S_1\}$. Selector signal $S_C$ for MUX C has a 1-bit signal ordering of $\{S_1, S_0, S_3, S_2\}$. Selector signal $S_D$ for MUX D has a 1-bit signal ordering of $\{S_2, S_1, S_0, S_3\}$. Each of the selector signals maintains a common sequence of 1-bit signals. However, the common sequence of 1-bit signals is successively shifted by a bit position to create each of the selector signals. Thus, the high 1-bit signal will have a different bit position in each of the selector signals at a given time. The high 1-bit signal determines which of the inputs received by the MUX will be transmitted to the output of the MUX.

With respect to MUX A, if the 1-bit signal $S_0$ is high in selector signal $S_A$, input $I_0$ will be transmitted to the output of MUX A. If the 1-bit signal $S_1$ is high in selector signal $S_A$, input $I_1$ will be transmitted to the output of MUX A. If the 1-bit signal $S_2$ is high in selector signal $S_A$, input $I_2$ will be transmitted to the output of MUX A. If the 1-bit signal $S_3$ is high in selector signal $S_A$, input $I_3$ will be transmitted to the output of MUX A.

With respect to MUX B, if the 1-bit signal $S_1$ is high in selector signal $S_B$, input $I_0$ will be transmitted to the output of MUX B. If the 1-bit signal $S_2$ is high in selector signal $S_B$, input $I_1$ will be transmitted to the output of MUX B. If the 1-bit signal $S_3$ is high in selector signal $S_B$, input $I_2$ will be transmitted to the output of MUX B. If the 1-bit signal $S_0$ is high in selector signal $S_B$, input $I_3$ will be transmitted to the output of MUX B.

With respect to MUX C, if the 1-bit signal $S_2$ is high in selector signal $S_C$, input $I_0$ will be transmitted to the output of MUX C. If the 1-bit signal $S_3$ is high in selector signal $S_C$, input $I_1$ will be transmitted to the output of MUX C. If the 1-bit signal $S_0$ is high in selector signal $S_C$, input $I_2$ will be transmitted to the output of MUX C. If the 1-bit signal $S_1$ is high in selector signal $S_C$, input $I_3$ will be transmitted to the output of MUX C.

With respect to MUX D, if the 1-bit signal $S_3$ is high in selector signal $S_D$, input $I_0$ will be transmitted to the output of MUX D. If the 1-bit signal $S_0$ is high in selector signal $S_D$, input $I_1$ will be transmitted to the output of MUX D. If the 1-bit signal $S_1$ is high in selector signal $S_D$, input $I_2$ will be transmitted to the output of MUX D. If the 1-bit signal $S_2$ is high in selector signal $S_D$, input $I_3$ will be transmitted to the output of MUX D.

Figure 2:
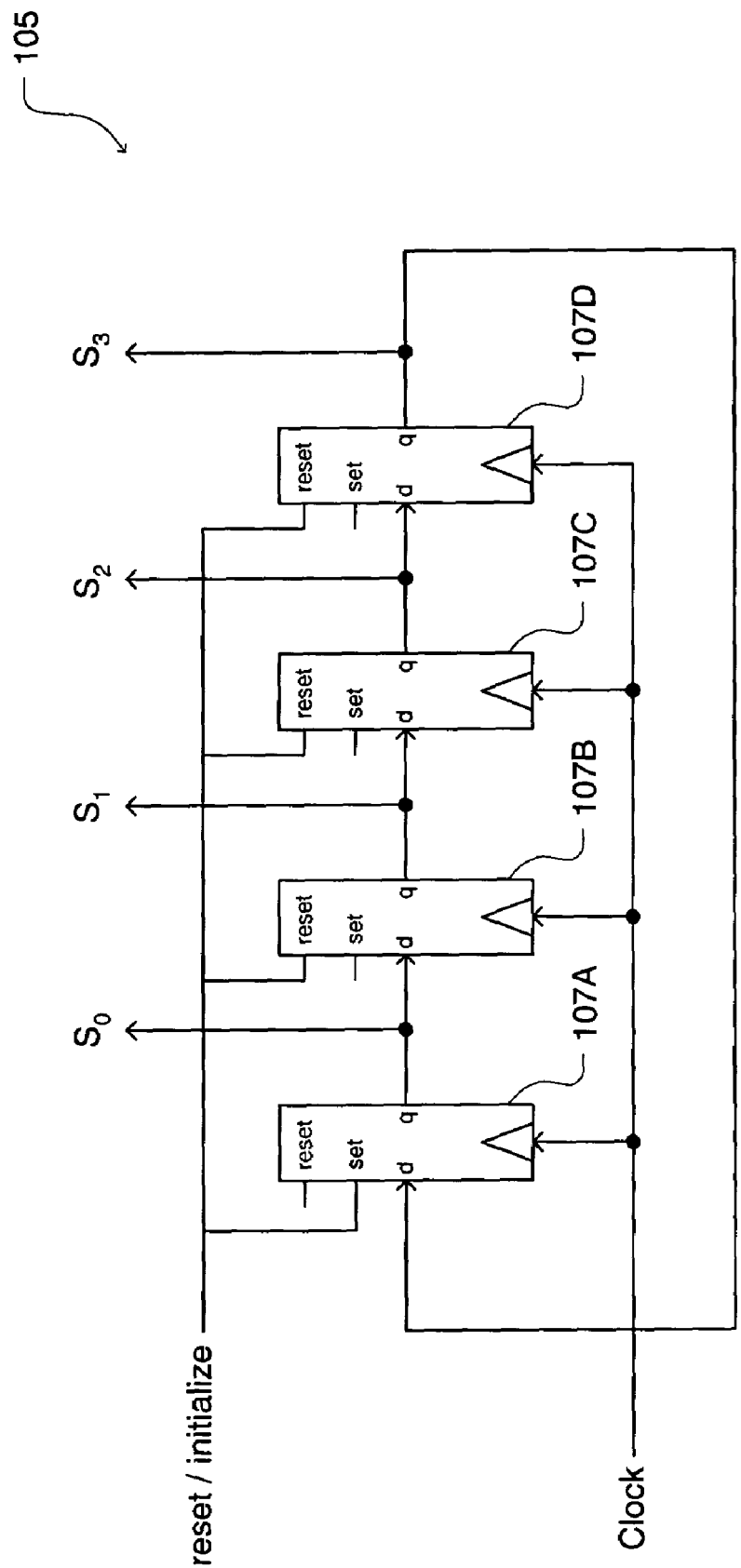
FIG. 2 is an illustration showing a rotating selector, in accordance with one embodiment of the present invention.

FIG. 2 is an illustration showing a rotating selector 105, in accordance with one embodiment of the present invention. The rotating selector 105 generates the 1-bit signals used to define each of the selector signals. The rotating selector 105 includes a number of cells 107A-107D corresponding to the number of 1-bit signals needed to generate each of the selector signals. Each cell 107A-107D receives a binary input (d) and a clock input and generates a binary output (q). The exemplary embodiment of FIG. 2 corresponds to the assembler 100 of FIG. 1B. Thus, four 1-bit signals $S_0$, $S_1$, $S_2$, and $S_3$ are generated by the cells 107A, 107B, 107C, and 107D, respectively. In one embodiment, each of the cells 107A-107D can be an edge-triggered cell such as a flip-flop. Upon receipt of a clock signal indicating a clock cycle, each of the cells 107A-107D will change the value of its internal state, and therefore, its output (q). Thus, each of the cells 107A-107D transmits its state to the next cell in the sequence at each clock cycle.

Each of the cells 107A-107D also includes a reset and set connection. Receipt of a high signal on the reset connection will cause the cell to hold a low signal. Receipt of a high signal on the set connection will cause the cell to hold a high signal. In the embodiment of FIG. 2, a reset/initialize signal is connected to the set connection of cell 107A and to the reset connection of cells 107B-107D. Thus, in the embodiment of FIG. 2, the cells 107A-107D can be initialized or reset such that cell 107A holds a high signal and each of cells 107B-107D holds a low signal. After initialization, the first clock cycle will cause cell 107B to generate a high signal and each of cells 107A, 107C, and 107D to generate a low signal. Thus, before the first clock cycle, $S_0$ is a high signal and $S_1$, $S_2$, and $S_3$ are low signals. In succeeding clock cycles, the high signal will rotate in sequence from $S_0$ to $S_1$ to $S_2$ to $S_3$ and back to $S_0$ to start the rotation again. Therefore, one instance of the rotating selector 105 circuitry is needed to generate all of the 1-bit signals $S_0$, $S_1$, $S_2$, and $S_3$ needed to define each of the selector signals $S_A$, $S_B$, $S_C$, and $S_D$. Hence, each of the selector signals $S_A$, $S_B$, $S_C$, and $S_D$ can be defined without using explicit arbitration circuitry.

FIG. 3 is an illustration showing a table of selector signals corresponding to clock cycles 0 through 8, in accordance with the embodiment illustrated in FIGS. 1 and 2. In clock cycle 0, the 1-bit signal $S_0$ is high and the remaining 1-bit signals $S_1$, $S_2$, and $S_3$ are low. In clock cycle 1, the 1-bit signal $S_1$ is high and the remaining 1-bit signals $S_2$, $S_3$, and $S_0$ are low. In clock cycle 2, the 1-bit signal $S_2$ is high and the remaining 1-bit signals $S_3$, $S_0$, and $S_1$ are low. In clock cycle 3, the 1-bit signal $S_3$ is high and the remaining 1-bit signals $S_0$, $S_1$, and $S_2$ are low. In clock cycle 4, the 1-bit signal $S_0$ is high again and the remaining 1-bit signals $S_1$, $S_2$, and $S_3$ are low again. The rotating of the high signal among the 1-bit signals continues in the same manner through the remaining clock cycles.

The rotation of the high signal among the 1-bit signals at each clock cycle has a corresponding effect on the selection signals for each of the MUXs. At a given clock cycle, the high signal occupies a different bit position in each of the selector signals $S_A$, $S_B$, $S_C$, and $S_D$. In this manner, the selector signals $S_A$, $S_B$, $S_C$, and $S_D$ control the MUXs A, B, C, and D, respectively, such that a data stream arriving at each of the inputs $I_0$, $I_1$, $I_2$, and $I_3$ will be distributed across the stepped arrangement of cells as the clock cycles. The operation of the assembler 100 can be described more completely by way of example. FIGS. 4-12 show an example of the rotating selector 105 and the assembler 100 operation through nine clock cycles (cycle 0 through cycle 8).

Figure 4:
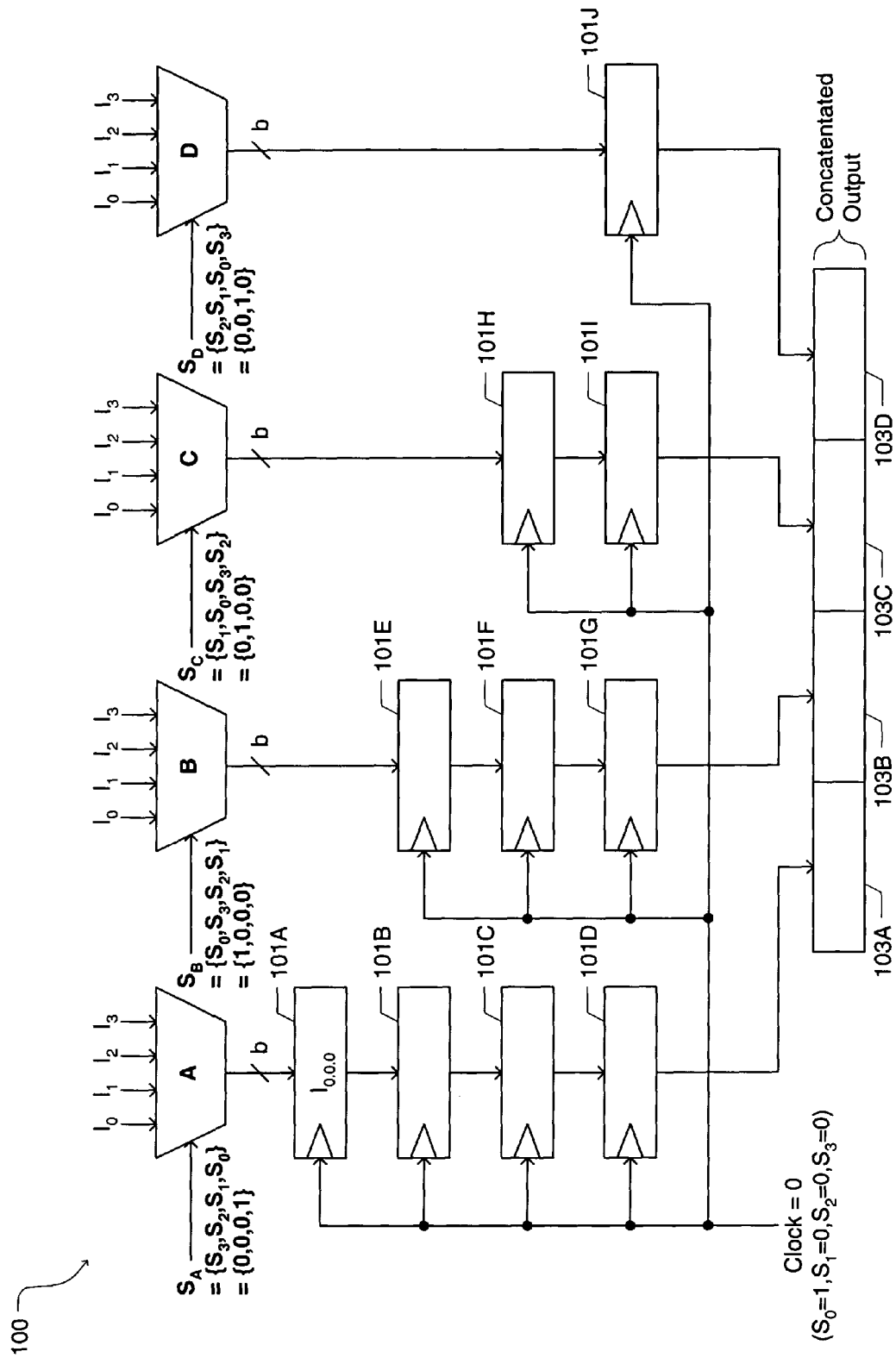
FIG. 4 is an illustration showing the assembler at a clock cycle 0, in accordance with one embodiment of the present invention.

FIG. 4 is an illustration showing the assembler 100 at a clock cycle 0, in accordance with one embodiment of the present invention. Prior to the clock cycle 0 a number of data streams arrive at inputs $I_0$, $I_1$, $I_2$, and $I_3$. The assembler 100 begins processing the number of data streams incoming at inputs $I_0$, $I_1$, $I_2$, and $I_3$ when $S_A$ is {0001}, {0010}, {0100}, and {1000}, respectively. Each of the number of data streams incoming at inputs $I_0$, $I_1$, $I_2$, and $I_3$ should be constrained to start on an appropriate clock edge. Once started, the processing for the data stream incoming at input $I_0$, $I_1$, $I_2$, and $I_3$ will continue when either $S_A$, $S_B$, $S_C$, or $S_D$ is {0001}, {0010}, {0100}, and {1000}, respectively.

At the clock cycle 0, $S_A$ is {0001}. Therefore, at the clock cycle 0, MUX A transmits a portion (i.e., a word) of the input $I_0$ data stream through the output of MUX A to the output of cell 101A. The portion of the input $I_0$ data stream transmitted to cell 101A at clock cycle 0 is indicated by $I_{0,0,0}$, wherein the input identifier is $I_0$, the data stream identifier is 0, and the portion identifier is 0.

Figure 5:
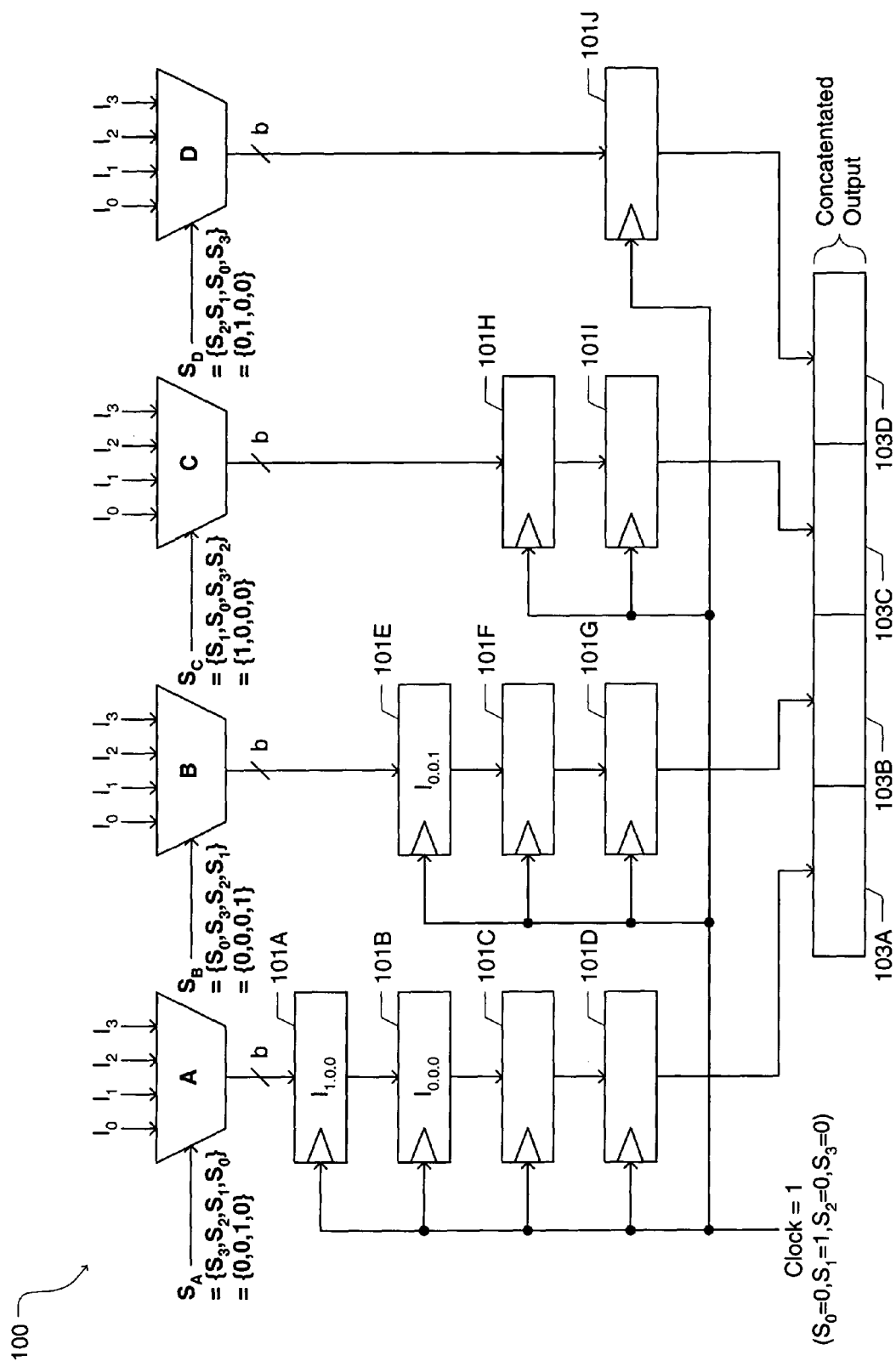
FIG. 5 is an illustration showing the assembler at a clock cycle 1, in accordance with one embodiment of the present invention.

FIG. 5 is an illustration showing the assembler 100 at a clock cycle 1, in accordance with one embodiment of the present invention. At the clock cycle 1, the $I_{0,0,0}$ portion of the $I_0$ data stream is transmitted from cell 101A to the output of cell 101B.

Also, at the clock cycle 1, $S_A$ is {0010}. Therefore, at the clock cycle 1, MUX A transmits a portion (i.e., a word) of the input $I_1$ data stream through the output of MUX A to the output of cell 101A. The portion of the input $I_1$ data stream transmitted to cell 101A at clock cycle 1 is indicated by $I_{1,0,0}$, wherein the input identifier is $I_1$, the data stream identifier is 0, and the portion identifier is 0.

Also, at the clock cycle 1, $S_B$ is {0001}. Therefore, at the clock cycle 1, MUX B transmits a next portion of the input $I_0$ data stream through the output of MUX B to the output of cell 101E. The next portion of the input $I_0$ data stream transmitted to cell 101E at clock cycle 1 is indicated by $I_{0,0,1}$, wherein the input identifier is $I_0$, the data stream identifier is 0, and the portion identifier is 1.

Figure 6:
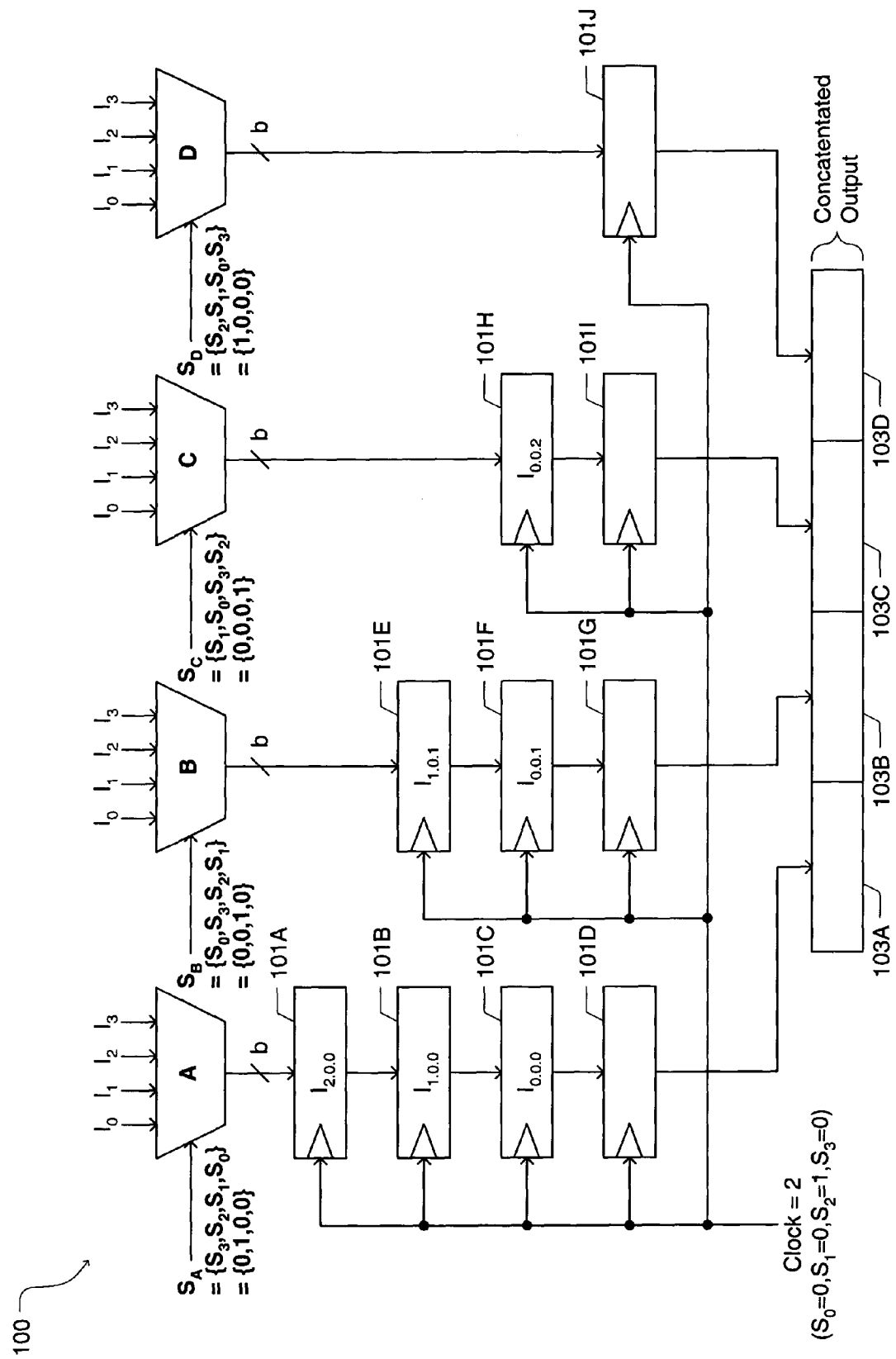
FIG. 6 is an illustration showing the assembler at a clock cycle 2, in accordance with one embodiment of the present invention.

FIG. 6 is an illustration showing the assembler 100 at a clock cycle 2, in accordance with one embodiment of the present invention. At the clock cycle 2, the $I_{0,0,0}$ portion of the $I_0$ data stream is transmitted from cell 101B to the output of cell 101C. Also, the $I_{1,0,0}$ portion of the $I_1$ data stream is transmitted from cell 101A to the output of cell 101B. Also, the $I_{0,0,1}$ portion of the $I_0$ data stream is transmitted from cell 101E to the output of cell 101F.

Also, at the clock cycle 2, $S_A$ is {0100}. Therefore, at the clock cycle 2, MUX A transmits a portion (i.e., a word) of the input $I_2$ data stream through the output of MUX A to the output of cell 101A. The portion of the input $I_2$ data stream transmitted to cell 101A at clock cycle 2 is indicated by $I_{2.0.0}$, wherein the input identifier is $I_2$, the data stream identifier is 0, and the portion identifier is 0.

Also, at the clock cycle 2, $S_B$ is {0010}. Therefore, at the clock cycle 2, MUX B transmits a next portion of the input $I_1$ data stream through the output of MUX B to the output of cell 101E. The next portion of the input $I_1$ data stream transmitted to cell 101E at clock cycle 2 is indicated by $I_{1.0.1}$, wherein the input identifier is $I_1$, the data stream identifier is 0, and the portion identifier is 1.

Also, at the clock cycle 2, $S_C$ is {0001}. Therefore, at the clock cycle 2, MUX C transmits a next portion of the input $I_0$ data stream through the output of MUX C to the output of cell 101H. The next portion of the input $I_0$ data stream transmitted to cell 101H at clock cycle 2 is indicated by $I_{0.0.2}$, wherein the input identifier is $I_0$, the data stream identifier is 0, and the portion identifier is 2.

Figure 7:
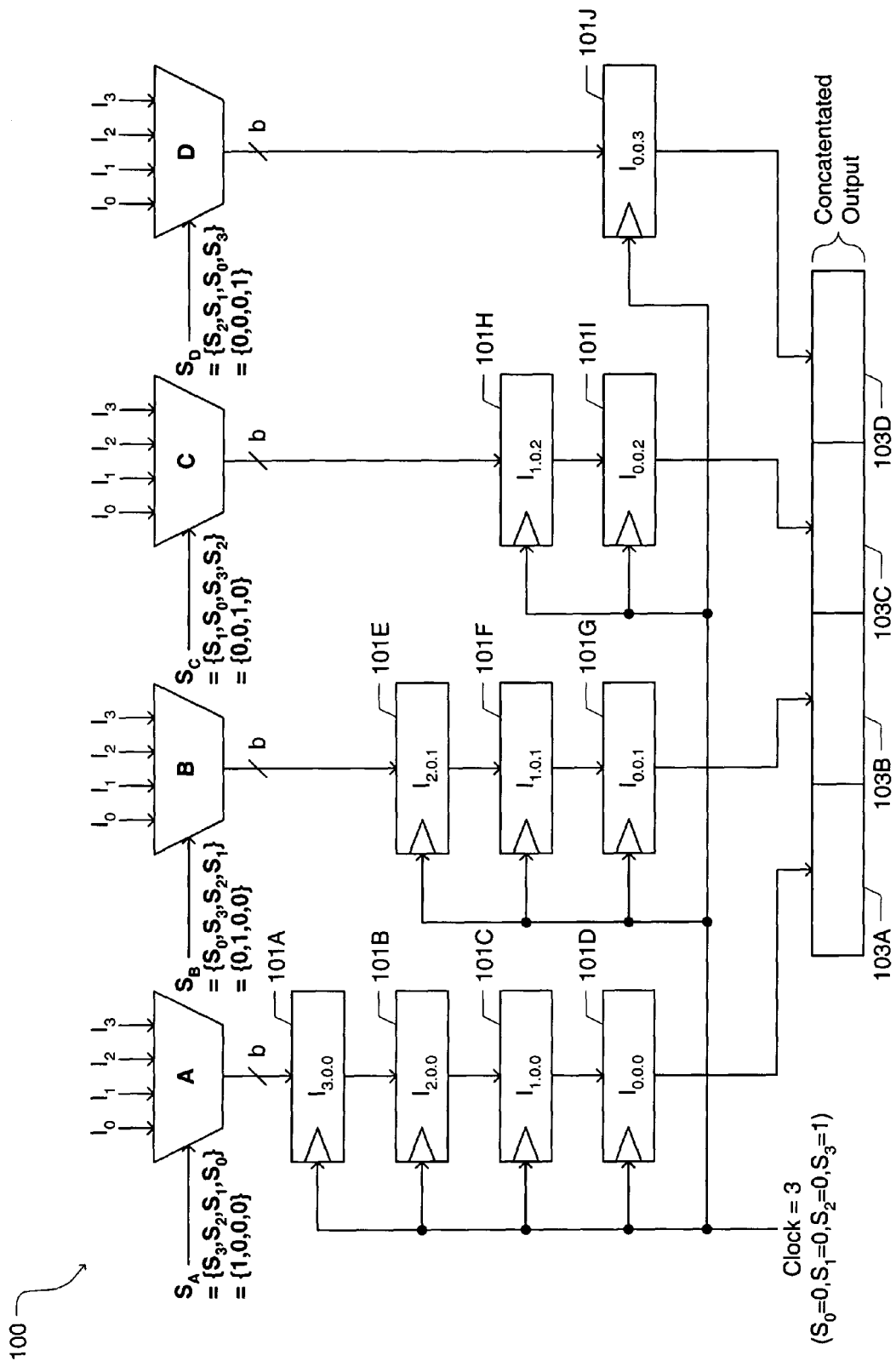
FIG. 7 is an illustration showing the assembler at a clock cycle 3, in accordance with one embodiment of the present invention.

FIG. 7 is an illustration showing the assembler 100 at a clock cycle 3, in accordance with one embodiment of the present invention. At the clock cycle 3, the $I_{0.0.0}$ portion of the $I_0$ data stream is transmitted from cell 101C to the output of cell 101D. Also, the $I_{1.0.0}$ portion of the $I_1$ data stream is transmitted from cell 101B to the output of cell 101C. Also, the $I_{2.0.0}$ portion of the $I_2$ data stream is transmitted from cell 101A to the output of cell 101B. Also, the $I_{0.0.1}$ portion of the $I_0$ data stream is transmitted from cell 101F to the output of cell 101G. Also, the $I_{1.0.1}$ portion of the $I_1$ data stream is transmitted from cell 101E to the output of cell 101F. Also, the $I_{0.0.2}$ portion of the $I_0$ data stream is transmitted from cell 101H to the output of cell 101I.

Also, at the clock cycle 3, $S_A$ is {1000}. Therefore, at the clock cycle 3, MUX A transmits a portion (i.e., a word) of the input $I_3$ data stream through the output of MUX A to the output of cell 101A. The portion of the input $I_3$ data stream transmitted to cell 101A at clock cycle 3 is indicated by $I_{3.0.0}$, wherein the input identifier is $I_3$, the data stream identifier is 0, and the portion identifier is 0.

Also, at the clock cycle 3, $S_B$ is {0100}. Therefore, at the clock cycle 3, MUX B transmits a next portion of the input $I_2$ data stream through the output of MUX B to the output of cell 101E. The next portion of the input $I_2$ data stream transmitted to cell 101E at clock cycle 3 is indicated by $I_{2.0.1}$, wherein the input identifier is $I_2$, the data stream identifier is 0, and the portion identifier is 1.

Also, at the clock cycle 3, $S_C$ is {0010}. Therefore, at the clock cycle 3, MUX C transmits a next portion of the input $I_1$ data stream through the output of MUX C to the output of cell 101H. The next portion of the input $I_1$ data stream transmitted to cell 101H at clock cycle 3 is indicated by $I_{1.0.2}$, wherein the input identifier is $I_1$, the data stream identifier is 0, and the portion identifier is 2.

Also, at the clock cycle 3, $S_D$ is {0001}. Therefore, at the clock cycle 3, MUX D transmits a next portion of the input $I_0$ data stream through the output of MUX D to the output of cell 101J. The next portion of the input $I_0$ data stream transmitted to cell 101J at clock cycle 3 is indicated by $I_{0.0.3}$, wherein the input identifier is $I_0$, the data stream identifier is 0, and the portion identifier is 3.

Figure 8:
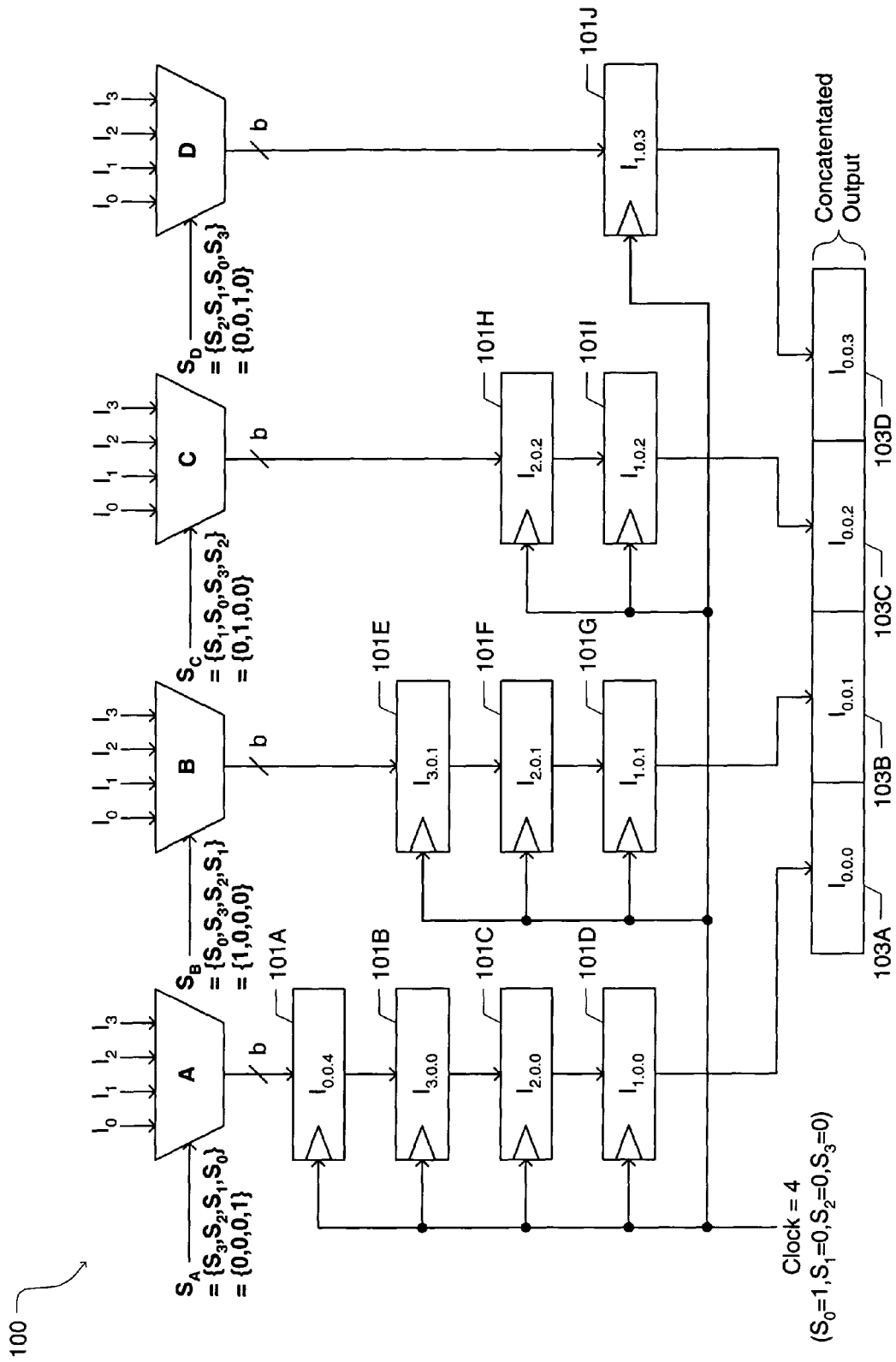
FIG. 8 is an illustration showing the assembler at a clock cycle 4, in accordance with one embodiment of the present invention.

FIG. 8 is an illustration showing the assembler 100 at a clock cycle 4, in accordance with one embodiment of the present invention. At the clock cycle 4, the $I_{0.0.0}$, $I_{0.0.1}$, $I_{0.0.2}$, and $I_{0.0.3}$ portions of the $I_0$ data stream are transmitted to the parts 103A, 103B, 103C, and 103D, respectively, of the concatenated output. Therefore, the first four portions of the $I_0$ data stream are concatenated together and provided as the concatenated output at the clock cycle 4.

Additionally, at the clock cycle 4, the $I_{1.0.0}$ portion of the $I_1$ data stream is transmitted from cell 101C to the output of cell 101D. Also, the $I_{2.0.0}$ portion of the $I_2$ data stream is transmitted from cell 101B to the output of cell 101C. Also, the $I_{3.0.0}$ portion of the $I_3$ data stream is transmitted from cell 101A to the output of cell 101B. Also, the $I_{1.0.1}$ portion of the $I_1$ data stream is transmitted from cell 101F to the output of cell 101G. Also, the $I_{2.0.1}$ portion of the $I_2$ data stream is transmitted from cell 101E to the output of cell 101F. Also, the $I_{1.0.2}$ portion of the $I_1$ data stream is transmitted from cell 101H to the output of cell 101I.

Also, at the clock cycle 4, $S_A$ is once again {0001}. Therefore, at the clock cycle 4, MUX A transmits a next portion of the input $I_0$ data stream through the output of MUX A to the output of cell 101A. The next portion of the input $I_0$ data stream transmitted to cell 101A at clock cycle 4 is indicated by $I_{0.0.4}$, wherein the input identifier is $I_0$, the data stream identifier is 0, and the portion identifier is 4.

Also, at the clock cycle 4, $S_B$ is {1000}. Therefore, at the clock cycle 4, MUX B transmits a next portion of the input $I_3$ data stream through the output of MUX B to the output of cell 101E. The next portion of the input $I_3$ data stream transmitted to cell 101E at clock cycle 4 is indicated by $I_{3.0.1}$, wherein the input identifier is $I_3$, the data stream identifier is 0, and the portion identifier is 1.

Also, at the clock cycle 4, $S_C$ is {0100}. Therefore, at the clock cycle 4, MUX C transmits a next portion of the input $I_2$ data stream through the output of MUX C to the output of cell 101H. The next portion of the input $I_2$ data stream transmitted to cell 101H at clock cycle 4 is indicated by $I_{2.0.2}$, wherein the input identifier is $I_2$, the data stream identifier is 0, and the portion identifier is 2.

Also, at the clock cycle 4, $S_D$ is {0010}. Therefore, at the clock cycle 4, MUX D transmits a next portion of the input $I_1$ data stream through the output of MUX D to the output of cell 101J. The next portion of the input $I_1$ data stream transmitted to cell 101J at clock cycle 4 is indicated by $I_{1.0.3}$, wherein the input identifier is $I_1$, the data stream identifier is 0, and the portion identifier is 3.

Figure 9:
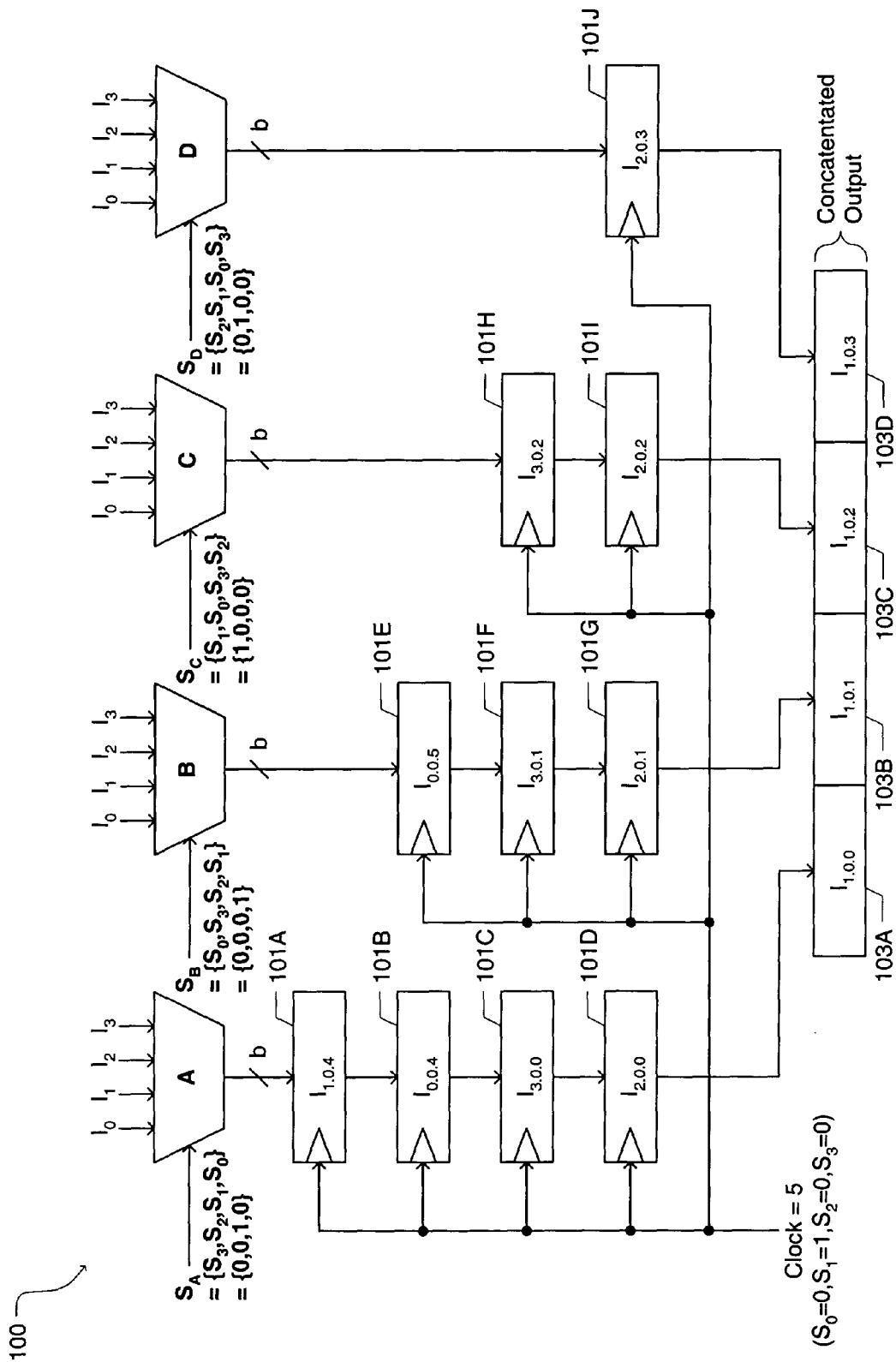
FIG. 9 is an illustration showing the assembler at a clock cycle 5, in accordance with one embodiment of the present invention.

FIG. 9 is an illustration showing the assembler 100 at a clock cycle 5, in accordance with one embodiment of the present invention. At the clock cycle 5, the $I_{1.0.0}$, $I_{1.0.1}$, $I_{1.0.2}$, and $I_{0.0.3}$ portions of the $I_1$ data stream are transmitted to the parts 103A, 103B, 103C, and 103D, respectively, of the concatenated output. Therefore, the first four portions of the $I_1$ data stream are concatenated together and provided as the concatenated output at the clock cycle 5.

Additionally, at the clock cycle 5, the $I_{2.0.0}$ portion of the $I_2$ data stream is transmitted from cell 101C to the output of cell 101D. Also, the $I_{3.0.0}$ portion of the $I_3$ data stream is transmitted from cell 101B to the output of cell 101C. Also, the $I_{0.0.4}$ portion of the $I_0$ data stream is transmitted from cell 101A to the output of cell 101B. Also, the $I_{2.0.1}$ portion of the $I_2$ data stream is transmitted from cell 101F to the output of cell 101G. Also, the $I_{3.0.1}$ portion of the $I_3$ data stream is transmitted from cell 101E to the output of cell 101F. Also, the $I_{2.0.2}$ portion of the $I_2$ data stream is transmitted from cell 101H to the output of cell 101I.

Also, at the clock cycle 5, $S_A$ is once again {0010}. Therefore, at the clock cycle 5, MUX A transmits a next portion of the input $I_1$ data stream through the output of MUX A to the output of cell 101A. The next portion of the input $I_1$ data stream transmitted to cell 101A at clock cycle 5 is indicated by $I_{1.0.4}$, wherein the input identifier is $I_1$, the data stream identifier is 0, and the portion identifier is 4.

Also, at the clock cycle 5, $S_B$ is once again {0001}. Therefore, at the clock cycle 5, MUX B transmits a next portion of the input $I_0$ data stream through the output of MUX B to the output of cell 101E. The next portion of the input $I_0$ data stream transmitted to cell 101E at clock cycle 5 is indicated by $I_{0,0,5}$, wherein the input identifier is $I_0$, the data stream identifier is 0, and the portion identifier is 5.

Also, at the clock cycle 5, $S_C$ is {1000}. Therefore, at the clock cycle 5, MUX C transmits a next portion of the input $I_3$ data stream through the output of MUX C to the output of cell 101H. The next portion of the input $I_3$ data stream transmitted to cell 101H at clock cycle 5 is indicated by $I_{3,0,2}$, wherein the input identifier is $I_3$, the data stream identifier is 0, and the portion identifier is 2.

Also, at the clock cycle 5, $S_D$ is {0100}. Therefore, at the clock cycle 5, MUX D transmits a next portion of the input $I_2$ data stream through the output of MUX D to the output of cell 101J. The next portion of the input $I_2$ data stream transmitted to cell 101J at clock cycle 5 is indicated by $I_{2,0,3}$, wherein the input identifier is $I_2$, the data stream identifier is 0, and the portion identifier is 3.

Figure 10:
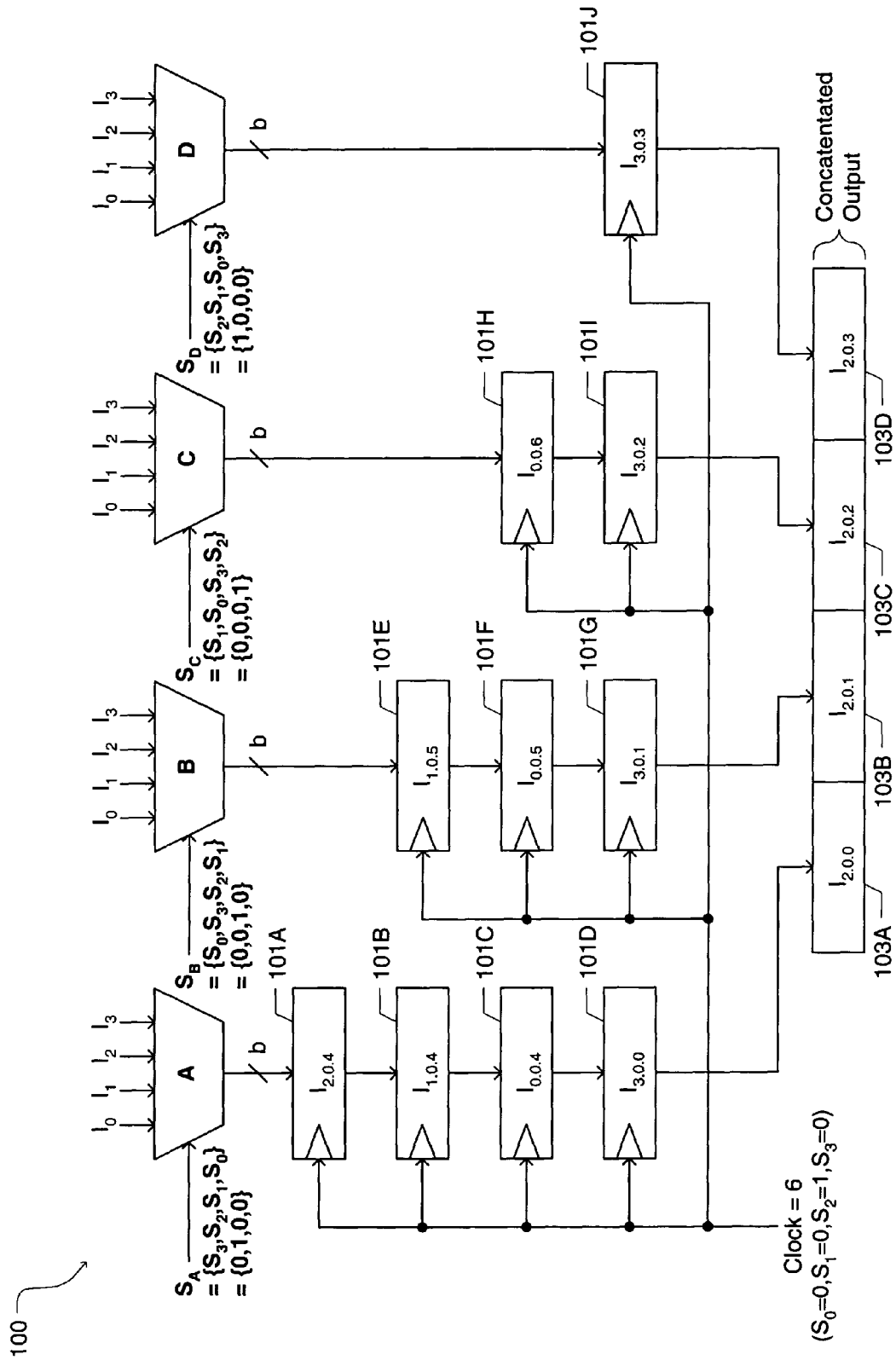
FIG. 10 is an illustration showing the assembler at a clock cycle 6, in accordance with one embodiment of the present invention.

FIG. 10 is an illustration showing the assembler 100 at a clock cycle 6, in accordance with one embodiment of the present invention. At the clock cycle 6, the $I_{2,0,0}$, $I_{2,0,1}$, $I_{2,0,2}$, and $I_{2,0,3}$ portions of the $I_2$ data stream are transmitted to the parts 103A, 103B, 103C, and 103D, respectively, of the concatenated output. Therefore, the first four portions of the $I_2$ data stream are concatenated together and provided as the concatenated output at the clock cycle 6.

Additionally, at the clock cycle 6, the $I_{3,0,0}$ portion of the $I_3$ data stream is transmitted from cell 101C to the output of cell 101D. Also, the $I_{0,0,4}$ portion of the $I_0$ data stream is transmitted from cell 101B to the output of cell 101C. Also, the $I_{1,0,4}$ portion of the $I_1$ data stream is transmitted from cell 101A to the output of cell 101B. Also, the $I_{3,0,1}$ portion of the $I_3$ data stream is transmitted from cell 101F to the output of cell 101G. Also, the $I_{0,0,5}$ portion of the $I_0$ data stream is transmitted from cell 101E to the output of cell 101F. Also, the $I_{3,0,2}$ portion of the $I_3$ data stream is transmitted from cell 101H to the output of cell 101I.

Also, at the clock cycle 6, $S_A$ is once again {0100}. Therefore, at the clock cycle 6, MUX A transmits a next portion of the input $I_2$ data stream through the output of MUX A to the output of cell 101A. The next portion of the input $I_2$ data stream transmitted to cell 101A at clock cycle 6 is indicated by $I_{2,0,4}$, wherein the input identifier is $I_2$, the data stream identifier is 0, and the portion identifier is 4.

Also, at the clock cycle 6, $S_B$ is once again {0010}. Therefore, at the clock cycle 6, MUX B transmits a next portion of the input $I_1$ data stream through the output of MUX B to the output of cell 101E. The next portion of the input $I_1$ data stream transmitted to cell 101E at clock cycle 6 is indicated by $I_{1,0,5}$, wherein the input identifier is $I_1$, the data stream identifier is 0, and the portion identifier is 5.

Also, at the clock cycle 6, $S_C$ is once again {0001}. Therefore, at the clock cycle 6, MUX C transmits a next portion of the input $I_0$ data stream through the output of MUX C to the output of cell 101H. The next portion of the input $I_0$ data stream transmitted to cell 101H at clock cycle 6 is indicated by $I_{0,0,6}$, wherein the input identifier is $I_0$, the data stream identifier is 0, and the portion identifier is 6.

Also, at the clock cycle 6, $S_D$ is {1000}. Therefore, at the clock cycle 6, MUX D transmits a next portion of the input $I_3$ data stream through the output of MUX D to the output of cell 101J. The next portion of the input $I_3$ data stream transmitted to cell 101J at clock cycle 6 is indicated by $I_{3,0,3}$, wherein the input identifier is $I_3$, the data stream identifier is 0, and the portion identifier is 3.

Figure 11:
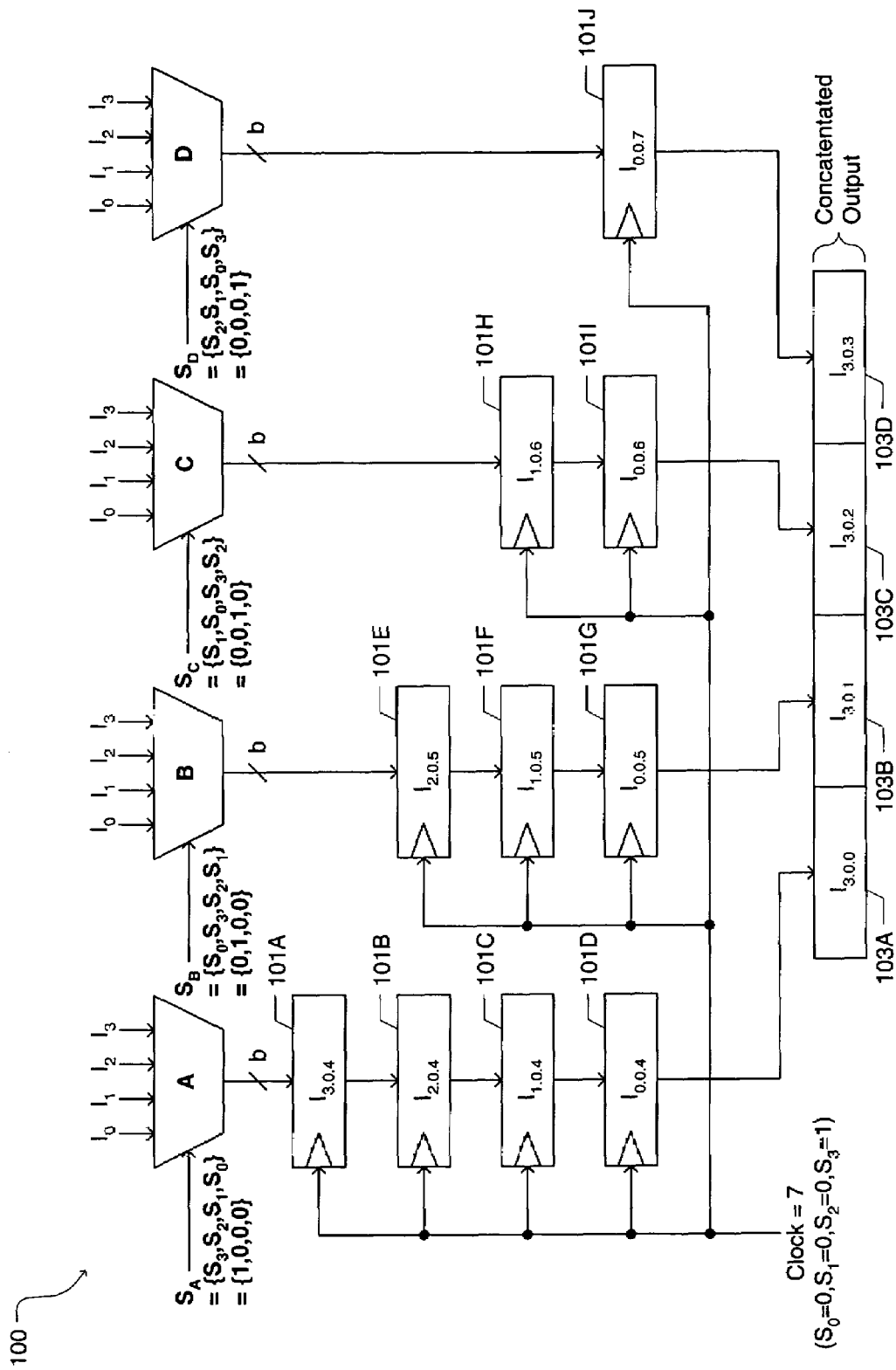
FIG. 11 is an illustration showing the assembler at a clock cycle 7, in accordance with one embodiment of the present invention.

FIG. 11 is an illustration showing the assembler 100 at a clock cycle 7, in accordance with one embodiment of the present invention. At the clock cycle 7, the $I_{3,0,0}$, $I_{3,0,1}$, $I_{3,0,2}$, and $I_{3,0,3}$ portions of the $I_3$ data stream are transmitted to the parts 103A, 103B, 103C, and 103D, respectively, of the concatenated output. Therefore, the first four portions of the $I_3$ data stream are concatenated together and provided as the concatenated output at the clock cycle 7.

Additionally, at the clock cycle 7, the $I_{0,0,4}$ portion of the $I_0$ data stream is transmitted from cell 101C to the output of cell 101D. Also, the $I_{0,0,4}$ portion of the $I_1$ data stream is transmitted from cell 101B to the output of cell 101C. Also, the $I_{2,0,4}$ portion of the $I_2$ data stream is transmitted from cell 101A to the output of cell 101B. Also, the $I_{0,0,5}$ portion of the $I_0$ data stream is transmitted from cell 101F to the output of cell 101G. Also, the $I_{1,0,5}$ portion of the $I_1$ data stream is transmitted from cell 101E to the output of cell 101F. Also, the $I_{0,0,6}$ portion of the $I_0$ data stream is transmitted from cell 101H to the output of cell 101I.

Also, at the clock cycle 7, $S_A$ is once again {1000}. Therefore, at the clock cycle 7, MUX A transmits a next portion of the input $I_3$ data stream through the output of MUX A to the output of cell 101A. The next portion of the input $I_3$ data stream transmitted to cell 101A at clock cycle 7 is indicated by $I_{3,0,4}$, wherein the input identifier is $I_3$, the data stream identifier is 0, and the portion identifier is 4.

Also, at the clock cycle 7, $S_B$ is once again {0100}. Therefore, at the clock cycle 7, MUX B transmits a next portion of the input $I_2$ data stream through the output of MUX B to the output of cell 101E. The next portion of the input $I_2$ data stream transmitted to cell 101E at clock cycle 7 is indicated by $I_{2,0,5}$, wherein the input identifier is $I_2$, the data stream identifier is 0, and the portion identifier is 5.

Also, at the clock cycle 7, $S_C$ is once again {0010}. Therefore, at the clock cycle 7, MUX C transmits a next portion of the input $I_1$ data stream through the output of MUX C to the output of cell 101H. The next portion of the input $I_1$ data stream transmitted to cell 101H at clock cycle 7 is indicated by $I_{1,0,6}$, wherein the input identifier is $I_1$, the data stream identifier is 0, and the portion identifier is 6.

Also, at the clock cycle 7, $S_D$ is once again {0001}. Therefore, at the clock cycle 7, MUX D transmits a next portion of the input $I_0$ data stream through the output of MUX D to the output of cell 101J. The next portion of the input $I_0$ data stream transmitted to cell 101J at clock cycle 7 is indicated by $I_{0,0,7}$, wherein the input identifier is $I_0$, the data stream identifier is 0, and the portion identifier is 7.

Figure 12:
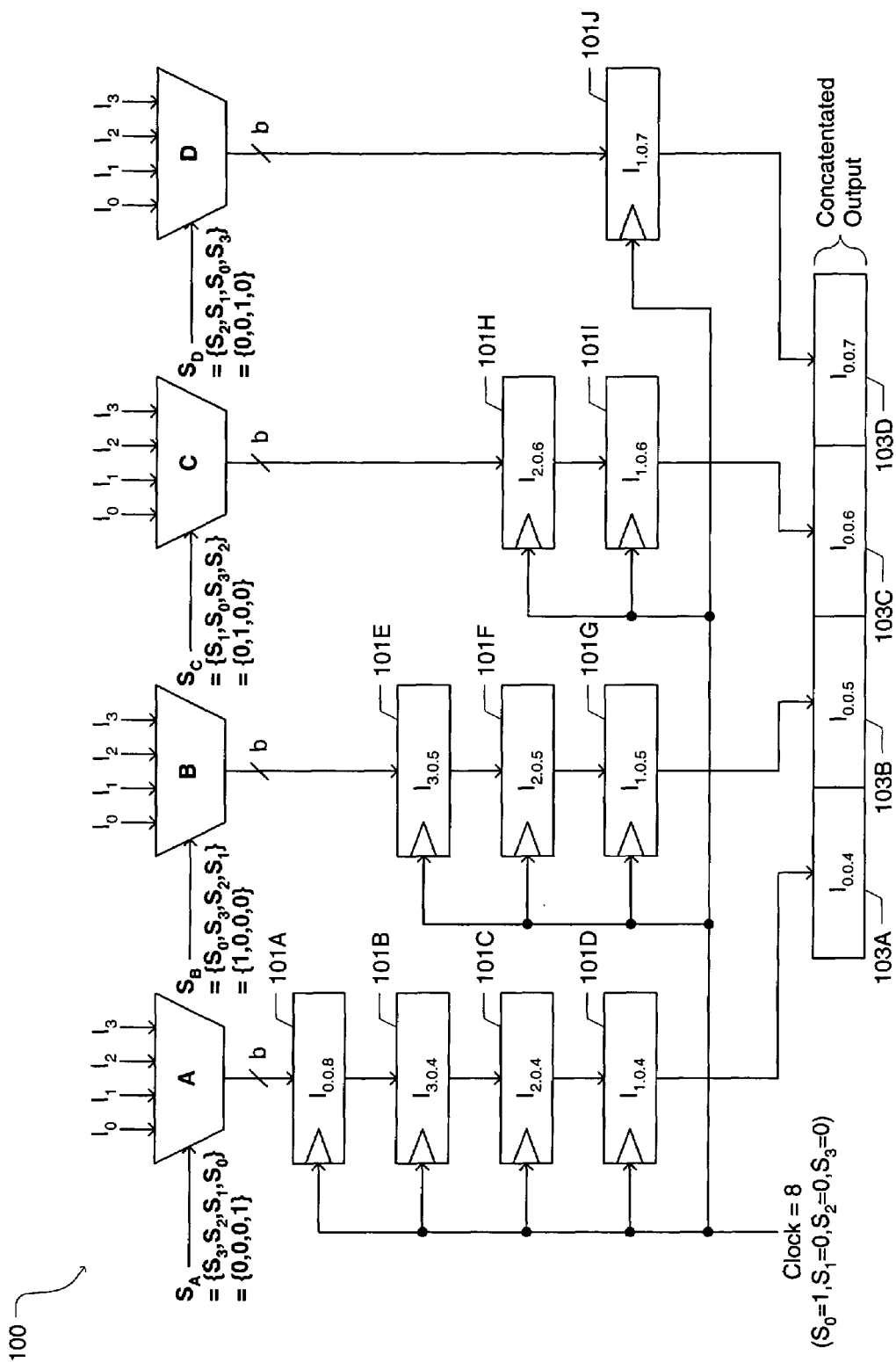
FIG. 12 is an illustration showing the assembler at a clock cycle 8, in accordance with one embodiment of the present invention.

FIG. 12 is an illustration showing the assembler 100 at a clock cycle 8, in accordance with one embodiment of the present invention. At the clock cycle 8, the $I_{0,0,4}$, $I_{0,0,5}$, $I_{0,0,6}$, and $I_{0,0,7}$ portions of the $I_0$ data stream are transmitted to the parts 103A, 103B, 103C, and 103D, respectively, of the concatenated output. Therefore, the next four portions of the $I_0$ data stream are concatenated together and provided as the concatenated output at the clock cycle 8.

Additionally, at the clock cycle 8, the $I_{1,0,4}$ portion of the $I_1$ data stream is transmitted from cell 101C to the output of cell 101D. Also, the $I_{2,0,4}$ portion of the $I_2$ data stream is transmitted from cell 101B to the output of cell 101C. Also, the $I_{3,0,4}$ portion of the $I_3$ data stream is transmitted from cell 101A to the output of cell 101B. Also, the $I_{1,0,5}$ portion of the $I_1$ data stream is transmitted from cell 101F to the output of cell 101G. Also, the $I_{2,0,5}$ portion of the $I_2$ data stream is transmitted from cell 101E to the output of cell 101F. Also, the $I_{1.0.6}$ portion of the $I_1$ data stream is transmitted from cell 101H to the output of cell 101I.

Also, at the clock cycle 8, $S_A$ is once again {0001}. Therefore, at the clock cycle 8, MUX A transmits a next portion of the input $I_0$ data stream through the output of MUX A to the output of cell 101A. The next portion of the input $I_0$ data stream transmitted to cell 101A at clock cycle 8 is indicated by $I_{0.0.8}$, wherein the input identifier is $I_0$, the data stream identifier is 0, and the portion identifier is 8.

Also, at the clock cycle 8, $S_B$ is once again {1000}. Therefore, at the clock cycle 8, MUX B transmits a next portion of the input $I_3$ data stream through the output of MUX B to the output of cell 101E. The next portion of the input $I_3$ data stream transmitted to cell 101E at clock cycle 8 is indicated by $I_{3.0.5}$, wherein the input identifier is $I_3$, the data stream identifier is 0, and the portion identifier is 5.

Also, at the clock cycle 8, $S_C$ is once again {0100}. Therefore, at the clock cycle 8, MUX C transmits a next portion of the input $I_2$ data stream through the output of MUX C to the output of cell 101H. The next portion of the input $I_2$ data stream transmitted to cell 101H at clock cycle 8 is indicated by $I_{2.0.6}$, wherein the input identifier is $I_2$, the data stream identifier is 0, and the portion identifier is 6.

Also, at the clock cycle 8, $S_D$ is once again {0010}. Therefore, at the clock cycle 8, MUX D transmits a next portion of the input $I_1$ data stream through the output of MUX D to the output of cell 101J. The next portion of the input $I_1$ data stream transmitted to cell 101J at clock cycle 8 is indicated by $I_{1.0.7}$, wherein the input identifier is $I_1$, the data stream identifier is 0, and the portion identifier is 7.

As demonstrated by the example shown in FIGS. 4-12, the assembler 100 and rotating selector 105 operate to concatenate four inputs $I_0$, $I_1$, $I_2$, and $I_3$ of (b) bits into a single concatenated output of (4b) bits. The data streams incoming on each of the four inputs $I_0$, $I_1$, $I_2$, and $I_3$ are sequentially presented in portions of (b) bits to the stepped arrangement of cells on each cycle of the clock. The concatenated output of (4b) bits is presented for a given input data stream once every four clock cycles. When data is streaming into the assembler on all four inputs $I_0$, $I_1$, $I_2$, and $I_3$, a new concatenated output from a different input data stream will be provided on every clock cycle. In one embodiment, the assembler 100 can be physically implemented to allow the concatenated output to be provided in Big Endian format. In another embodiment, the assembler 100 can be physically implemented to allow the concatenated output to be provided in Little Endian format.

The concatenated output can be provided from the assembler 100 to an electronic element capable of receiving an input having the bandwidth associated with the concatenated output. In one embodiment, the electronic element is a memory element or buffer. In a complementary manner, it may also be necessary to disassemble the concatenated output into the original data streams from which it is formed.

Figure 13:
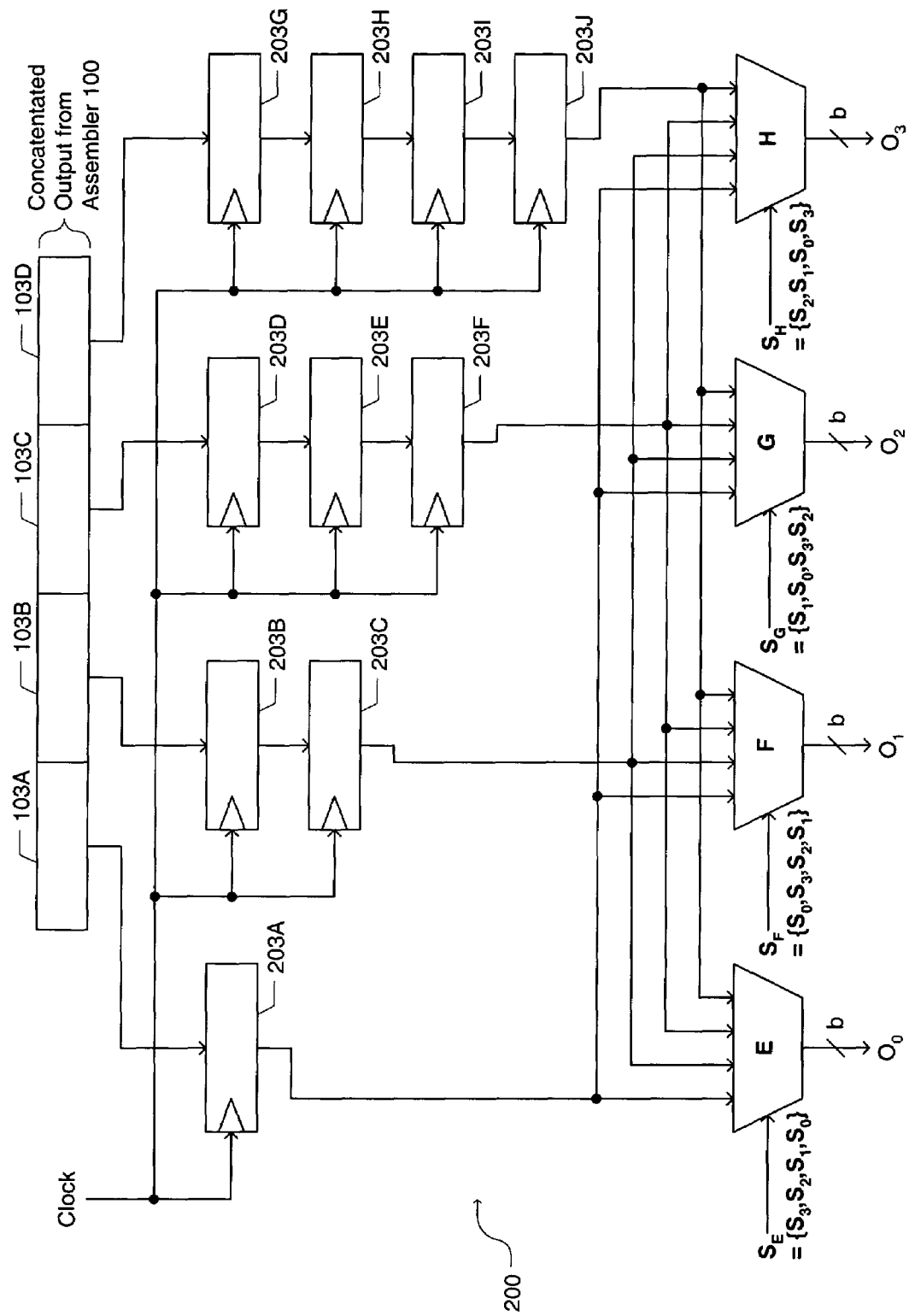
FIG. 13 is an illustration showing a disassembler of a bandwidth matching device, in accordance with one embodiment of the present invention.

FIG. 13 is an illustration showing a disassembler 200 of a bandwidth matching device, in accordance with one embodiment of the present invention. The disassembler 200 is capable of receiving as an input the concatenated output from the assembler 100. Each part 103A, 103B, 103C, and 103D of the input (i.e., concatenated output from the assembler 100) is transmitted to an input of a cell 203A, a cell 203B, a cell 203D, and a cell 203G, respectively. Each of cells 203B, 203D, and 203G are serially connected to a number of other cells.

An output of the cell 203B is connected to an input of a cell 203C. An output of the cell 203D is connected to an input of a cell 203E. An output of the cell 203E is connected to an input of a cell 203F. An output of the cell 203G is connected to an input of a cell 203H. An output of the cell 203H is connected to an input of a cell 203I. An output of the cell 203I is connected to an input of a cell 203J.

In the aforementioned manner, the number of serially connected cells 203B-203J, and the cell 203A, form a stepped arrangement of cells. In one embodiment, each of the cells 203A-203J can be an edge-triggered cell such as a flip-flop. Upon receipt of a clock signal indicating a clock cycle, each of the cells 203A-203J will transmit the data currently at its input to its output. In one embodiment, a device supplying the input (i.e., the concatenated output from the assembler 100) has an adequate drive capability and a sufficient setup time relative to an input stage of a device downstream of cell 203A such that the cells 203A, 203B, 203D, and 203G are not required in the disassembler 200. For completeness, however, cells 203A, 203B, 203D, and 203G will be retained in the present discussion of the disassembler 200.

The outputs of cells 203A, 203C, 203F, and 203J are provided as inputs to each of four MUXs E, F, G, and H. Each MUX E, F, G, and H receives a selector signal $S_E$, $S_F$, $S_G$, and $S_H$, respectively. Also, each MUX E, F, G, and H has an output $O_0$, $O_1$, $O_2$, and $O_3$, respectively. Each selector signal $S_E$, $S_F$, $S_G$, and $S_H$ is used to control which of the inputs (received from cells 203A, 203C, 203F, and 203J) will be transmitted to the output of each of the MUXs E, F, G, and H, respectively. Each of the MUXs E, F, G, and H are smaller than MUXs used in conventional disassembler circuitry.

In the embodiment of FIG. 13, each of the selector signals SE, SF, SG, and SH consists of four 1-bit signals with one of the 1-bit signals being high at a given time (i.e., "one-hot"). The number of 1-bit signals in the selector signal of a particular MUX is equal to the number of inputs received by the MUX. Since each of the MUXs E, F, G, and H is configured to receive four inputs, each selector signal contains four 1-bit signals. In other embodiments, the disassembler 200 may be defined to work in conjunction with an assembler 100 that generates a concatenated output having a different number of parts. In these other embodiments, the number of 1-bit signals in the selector signal of a particular MUX will continue to be equal to the number of inputs received by the MUX, with one 1-bit signal being high at a given time. In another embodiment, each of the MUXs E, F, G, and H can be something other than one-hot encoded. For example, the MUXs E, F, G, and H could have (n) control inputs encoded to select ($2^n$) inputs.

The ordering of the 1-bit signals in the selector signals vary between the MUXs. Selector signal $SE_E$ for MUX E has a 1-bit signal ordering of $\{S_3, S_2, S_1, S_0\}$. Selector signal $S_F$ for MUX F has a 1-bit signal ordering of $\{S_0, S_3, S_2, S_1\}$. Selector signal $S_G$ for MUX G has a 1-bit signal ordering of $\{S_1, S_0, S_3, S_2\}$. Selector signal $S_H$ for MUX H has a 1-bit signal ordering of $\{S_2, S_1, S_0, S_3\}$. Each of the selector signals maintains a common sequence of 1-bit signals. However, the common sequence of 1-bit signals is successively shifted by a bit position to create each of the selector signals. Thus, the high 1-bit signal will have a different bit position in each of the selector signals at a given time. The high 1-bit signal determines which of the inputs received by the MUX will be transmitted to the output of the MUX.

With respect to MUX E, if the 1-bit signal $S_0$ is high in selector signal $S_E$, input received from cell 203A will be transmitted to the output of MUX E. If the 1-bit signal $S_1$ is high in selector signal $S_E$, input received from cell 203C will be transmitted to the output of MUX E. If the 1-bit signal $S_2$ is high in selector signal $S_E$, input received from cell 203F will be transmitted to the output of MUX E. If the 1-bit signal $S_3$ is high in selector signal $S_E$, input received from cell 203J will be transmitted to the output of MUX E.

With respect to MUX F, if the 1-bit signal $S_1$ is high in selector signal $S_F$, input received from cell 203A will be transmitted to the output of MUX F. If the 1-bit signal $S_2$ is high in selector signal $S_F$, input received from cell 203C will be transmitted to the output of MUX F. If the 1-bit signal $S_3$ is high in selector signal $S_F$, input received from cell 203F will be transmitted to the output of MUX F. If the 1-bit signal $S_0$ is high in selector signal $S_F$, input received from cell 203J will be transmitted to the output of MUX F.

With respect to MUX G, if the 1-bit signal $S_2$ is high in selector signal $S_G$, input received from cell 203A will be transmitted to the output of MUX G. If the 1-bit signal $S_3$ is high in selector signal $S_G$, input received from cell 203C will be transmitted to the output of MUX G. If the 1-bit signal $S_0$ is high in selector signal $S_G$, input received from cell 203F will be transmitted to the output of MUX G. If the 1-bit signal $S_1$ is high in selector signal $S_G$, input received from cell 203J will be transmitted to the output of MUX G.

With respect to MUX H, if the 1-bit signal $S_3$ is high in selector signal $S_H$, input received from cell 203A will be transmitted to the output of MUX H. If the 1-bit signal $S_0$ is high in selector signal $S_H$, input received from cell 203C will be transmitted to the output of MUX H. If the 1-bit signal $S_1$ is high in selector signal $S_H$, input received from cell 203F will be transmitted to the output of MUX H. If the 1-bit signal $S_2$ is high in selector signal $S_H$, input received from cell 203J will be transmitted to the output of MUX H.

The rotating selector 105 previously described with respect to FIG. 2 is also used to generate the 1-bit signals used to define each of the selector signals $S_E$, $S_F$, $S_G$, and $S_H$. As previously discussed, in the embodiment of FIG. 2, the cells 107A-107D can be initialized or reset such that cell 107A holds a high signal and each of cells 107B-107D holds a low signal. After initialization, the first clock cycle will cause cell 107B to generate a high signal and each of cells 107A, 107C, and 107D to generate a low signal. Thus, at initialization, $S_0$ is a high signal and $S_1$, $S_2$, and $S_3$ are low signals. In succeeding clock cycles, the high signal will rotate in sequence from $S_0$ to $S_1$ to $S_2$ to $S_3$ and back to $S_0$ to start the rotation again. Therefore, one instance of the rotating selector 105 circuitry is needed to generate all of the 1-bit signals $S_0$, $S_1$, $S_2$, and $S_3$ needed to define each of the selector signals $S_E$, $S_F$, $S_G$, and $S_H$. Hence, each of the selector signals $S_E$, $S_F$, $S_G$, and $S_H$ can be defined without using explicit arbitration circuitry. In one embodiment where the bandwidth matching device is implemented with both the assembler 100 and disassembler 200, a single instance of the rotating selector 105 can be used to generate all of the 1-bit signals $S_0$, $S_1$, $S_2$, and $S_3$ needed to define each of the selector signals $S_A$, $S_B$, $S_C$, $S_D$, $S_E$, $S_F$, $S_G$, and $S_H$. Alternatively, in another embodiment, different instances of the rotating selector 105 can be used to generate different instances of the 1-bit signals $S_0$, $S_1$, $S_2$, and $S_3$ such that the group of selector signals $S_A$, $S_B$, $S_C$, and $S_D$ can be defined independently from the group of selector signals $S_E$, $S_F$, $S_G$, and $S_H$.

As previously discussed, FIG. 3 is an illustration showing a table of selector signals corresponding to clock cycles 0 through 8 for the assembler 100 embodiment illustrated in FIGS. 1 and 2. FIG. 3 also shows the selector signals $S_E$, $S_F$, $S_G$, and $S_H$ corresponding to the disassembler 200 embodiment illustrated in FIGS. 13 and 2.

The rotation of the high signal among the 1-bit signals at each clock cycle has a corresponding effect on the selection signals for each of the MUXs. At a given clock cycle, the high signal occupies a different bit position in each of the selector signals $S_E$ $S_F$ $S_G$ and $S_H$. In this manner, the selector signals $S_E$, $S_F$, $S_G$, and $S_H$ control the MUXs E, F, G, and H, respectively, such that a series of concatenated outputs from the assembler 100 (provided as the input to the disassembler 200) will be distributed across the stepped arrangement of cells as the clock cycles. The stepped arrangement of cells operating in conjunction with the MUXs serve to transform the series of concatenated outputs from the assembler 100 into a number of original data streams representing the inputs provided to the assembler 100. Each of the number of original data streams are provided as output from the disassembler 200 through the outputs $O_0$, $O_1$, $O_2$, and $O_3$ of the MUXs E, F, G, and H, respectively. The operation of the disassembler 200 can be described more completely by way of example. FIGS. 14-20 show an example of the rotating selector 105 and the disassembler 200 operation through six clock cycles (cycle 0 through cycle 5).

Figure 14:
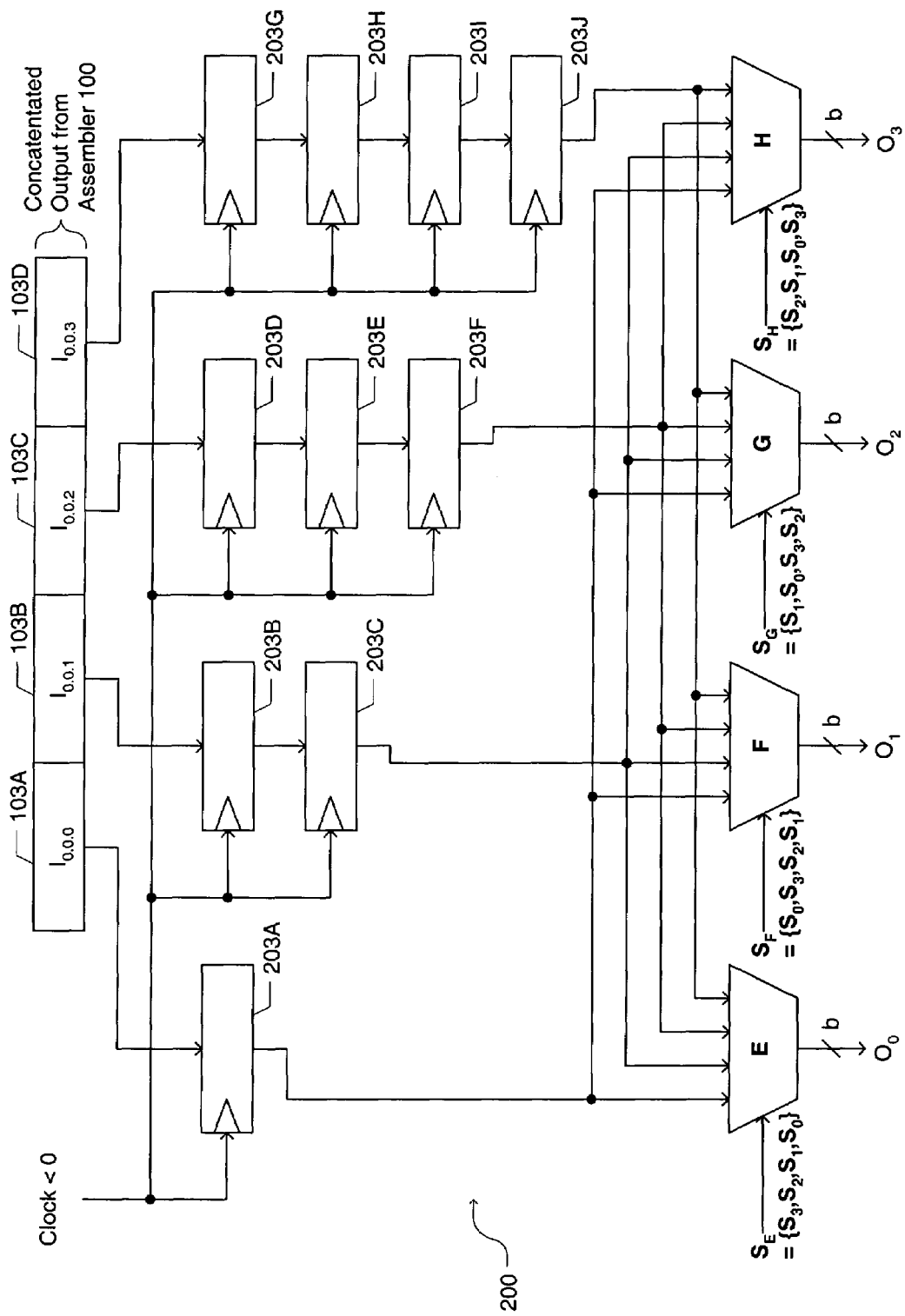
FIG. 14 is an illustration showing the disassembler prior to a clock cycle 0, in accordance with one embodiment of the present invention.

FIG. 14 is an illustration showing the disassembler 200 prior to a clock cycle 0, in accordance with one embodiment of the present invention. Prior to the clock cycle 0 a first concatenated output from the assembler 100 is received at the input of the disassembler 200. Each part 103A, 103B, 103C, and 103D of the concatenated output is presented to the inputs of cells 203A, 203B, 203D, and 203G, respectively. In the example of FIG. 14, the first concatenated output from the assembler 100 represents the first four portions of the $I_0$ data stream (i.e., $I_{0.0.0}$, $I_{0.0.1}$, $I_{0.0.2}$, and $I_{0.0.3}$). Therefore, prior to the clock cycle 0, $I_{0.0.0}$ is presented to the input of cell 203A, $I_{0.0.1}$ is presented to the input of cell 203B, $I_{0.0.2}$ is presented to the input of cell 203D, and $I_{0.0.3}$ is presented to the input of cell 203G.

Figure 15:
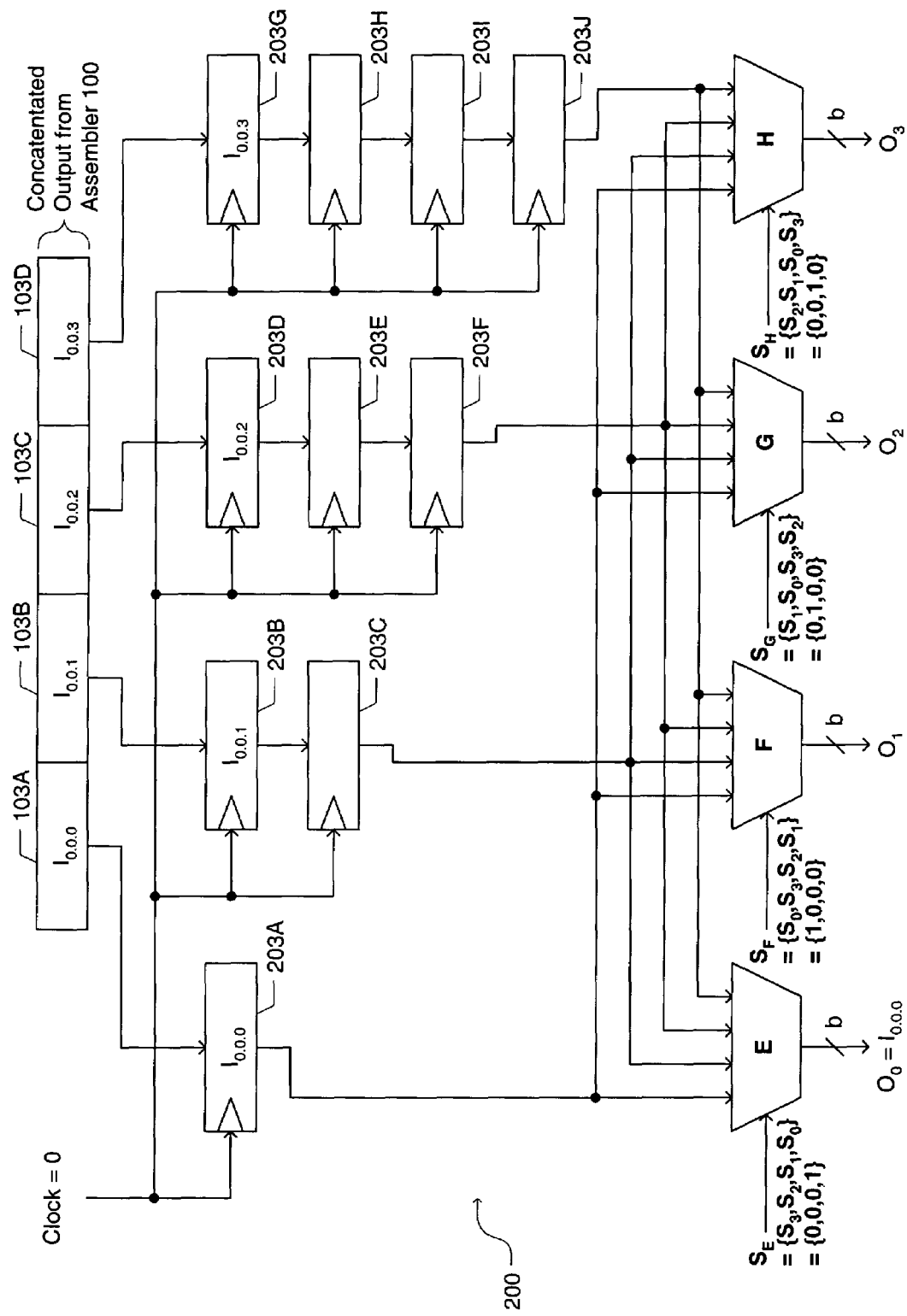
FIG. 15 is an illustration showing the disassembler at a clock cycle 0, in accordance with one embodiment of the present invention.

FIG. 15 is an illustration showing the disassembler 200 at a clock cycle 0, in accordance with one embodiment of the present invention. Prior to the clock cycle 0, the first concatenated output from the assembler 100 is received at the input of the disassembler 200. Each part 103A, 103B, 103C, and 103D of the concatenated output is presented to the inputs of cells 203A, 203B, 203D, and 203G, respectively. The concatenated output from the assembler 100 represents the first four portions of the $I_0$ data stream (i.e., $I_{0.0.0}$, $I_{0.0.1}$, $I_{0.0.2}$, and $I_{0.0.3}$). Therefore, at the clock cycle 0, $I_{0.0.0}$ is transmitted to the output of cell 203A, $I_{0.0.1}$ is transmitted to the output of cell 203B, $I_{0.0.2}$ is transmitted to the output of cell 203D, and $I_{0.0.3}$ is transmitted to the output of cell 203G.

Also, at the clock cycle 0, $S_E$ is {0001}. Therefore, during clock cycle 0, MUX E propagates the contents of cell 203A ($I_{0.0.0}$) through to the output $O_0$.

Figure 16:
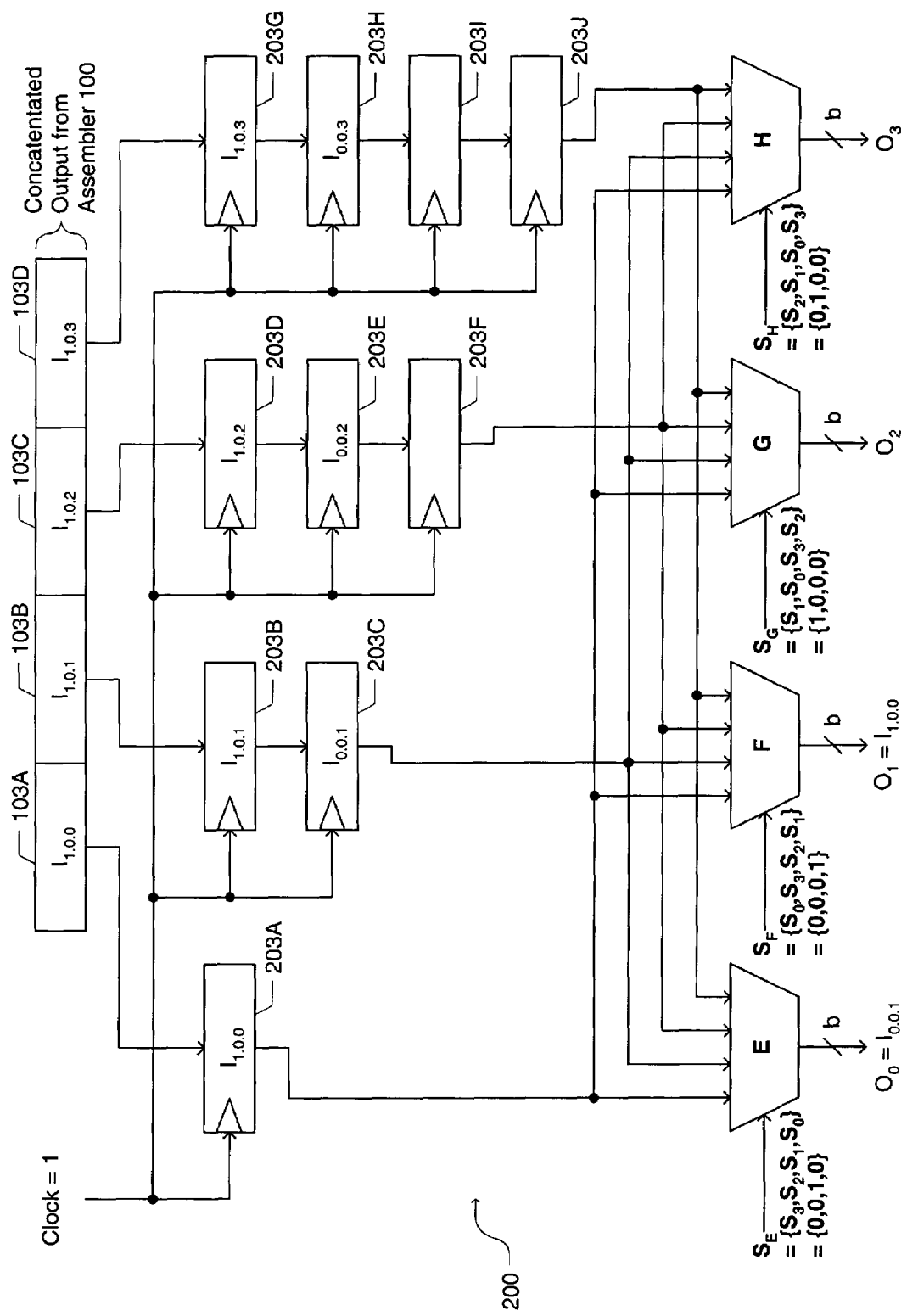
FIG. 16 is an illustration showing the disassembler at a clock cycle 1, in accordance with one embodiment of the present invention.

FIG. 16 is an illustration showing the disassembler 200 at a clock cycle 1, in accordance with one embodiment of the present invention. At the clock cycle 1, the contents of cell 203B ($I_{0.0.1}$) are transmitted to the output of cell 203C. The contents of cell 203D ($I_{0.0.2}$) are transmitted to the output of cell 203E. The contents of cell 203G ($I_{0.0.3}$) are transmitted to the output of cell 203H.

Also, prior to the clock cycle 1, a next concatenated output from the assembler 100 is received at the input of the disassembler 200. Again, each part 103A, 103B, 103C, and 103D of the concatenated output is presented to the inputs of cells 203A, 203B, 203D, and 203G, respectively. The next concatenated output from the assembler 100 represents the first four portions of the $I_1$ data stream (i.e., $I_{1.0.0}$, $I_{1.0.1}$, $I_{1.0.2}$, and $I_{1.0.3}$). Therefore, at the clock cycle 1, $I_{1.0.0}$ is transmitted to the output of cell 203A, $I_{1.0.1}$ is transmitted to the output of cell 203B, $I_{1.0.2}$ is transmitted to the output of cell 203D, and $I_{1.0.3}$ is transmitted to the output of cell 203G.

Also at clock cycle 1, $S_E$ is {0010}. Therefore, during the clock cycle 1, MUX E propagates the contents of cell 203C ($I_{0.0.1}$) through to the output $O_0$. Also, at the clock cycle 1, $S_F$ is {0001}. Therefore, during the clock cycle 1, MUX F propagates the contents of cell 203A ($I_{1.0.0}$) through to the output $O_1$.

Figure 17:
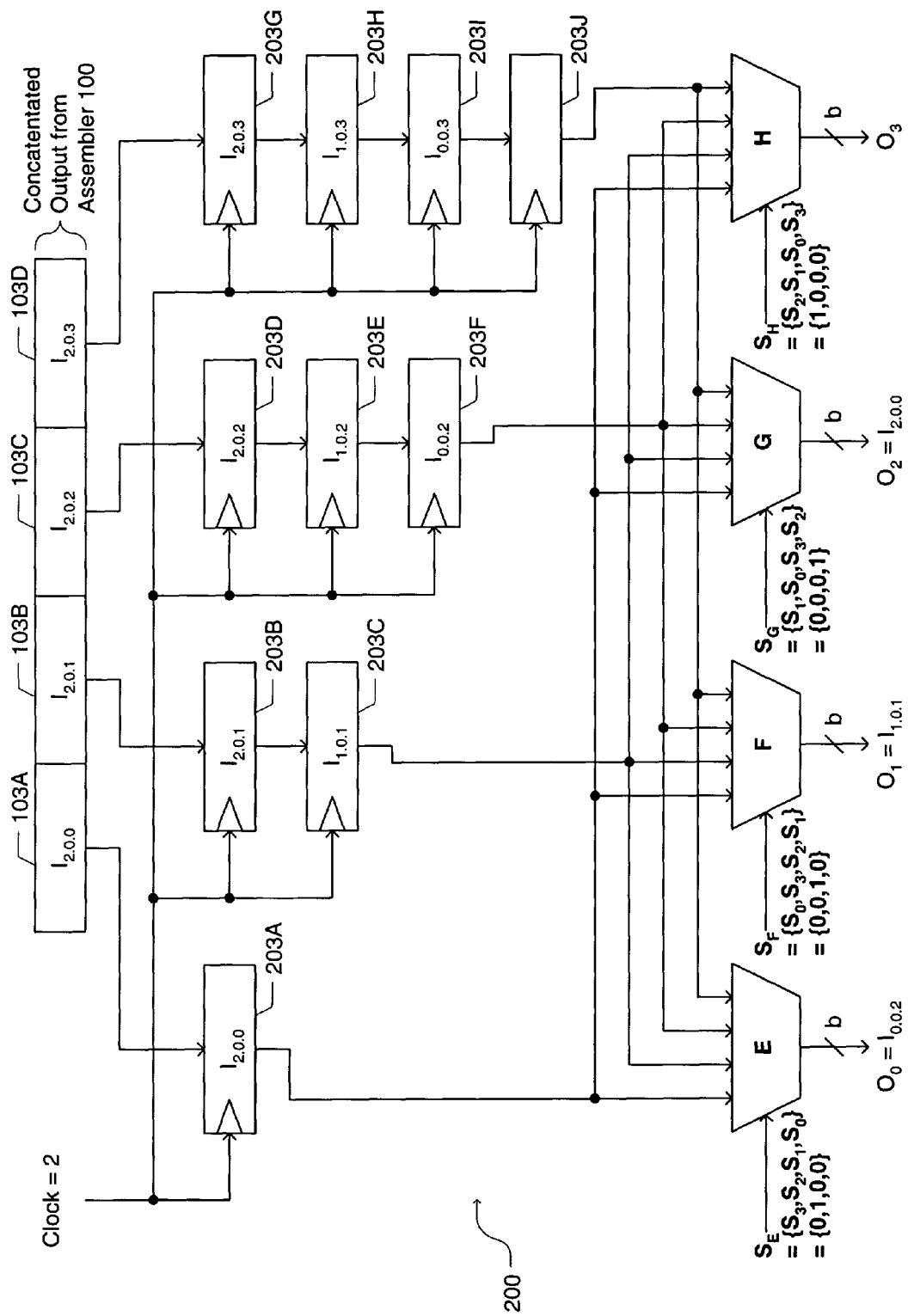
FIG. 17 is an illustration showing the disassembler at a clock cycle 2, in accordance with one embodiment of the present invention.

FIG. 17 is an illustration showing the disassembler 200 at a clock cycle 2, in accordance with one embodiment of the present invention. At clock cycle 2, the contents of cell 203B ($I_{1.0.1}$) are transmitted to the output of cell 203C. The contents of cell 203E ($I_{0.0.2}$) are transmitted to the output of cell 203F. The contents of cell 203D ($I_{1.0.2}$) are transmitted to the output of cell 203E. The contents of cell 203H ($I_{0.0.3}$) are transmitted to the output of cell 203I. The contents of cell 203G ($I_{1.0.3}$) are transmitted to the output of cell 203H.

Also, prior to the clock cycle 2, a next concatenated output from the assembler 100 is received at the input of the disassembler 200. Again, each part 103A, 103B, 103C, and 103D of the concatenated output is presented to the inputs of cells 203A, 203B, 203D, and 203G, respectively. The next concatenated output from the assembler 100 represents the first four portions of the $I_2$ data stream (i.e., $I_{2.0.0}$, $I_{2.0.1}$, $I_{2.0.2}$, and $I_{2.0.3}$). Therefore, at the clock cycle 2, $I_{2.0.0}$ is transmitted to the output of cell 203A, $I_{2.0.1}$ is transmitted to the output of cell 203B, $I_{2.0.2}$ is transmitted to the output of cell 203D, and $I_{2.0.3}$ is transmitted to the output of cell 203G.

Also at clock cycle 2, $S_E$ is {0100}. Therefore, during the clock cycle 2, MUX E propagates the contents of cell 203F ($I_{0.0.2}$) through to the output $O_0$. Also, at the clock cycle 2, $S_F$ is {0010}. Therefore, during the clock cycle 2, MUX F propagates the contents of cell 203C ($I_{1.0.1}$) through to the output $O_1$. Also, at the clock cycle 2, $S_G$ is {0001}. Therefore, during the clock cycle 2, MUX G propagates the contents of cell 203A ($I_{2.0.0}$) through to the output $O_2$.

Figure 18:
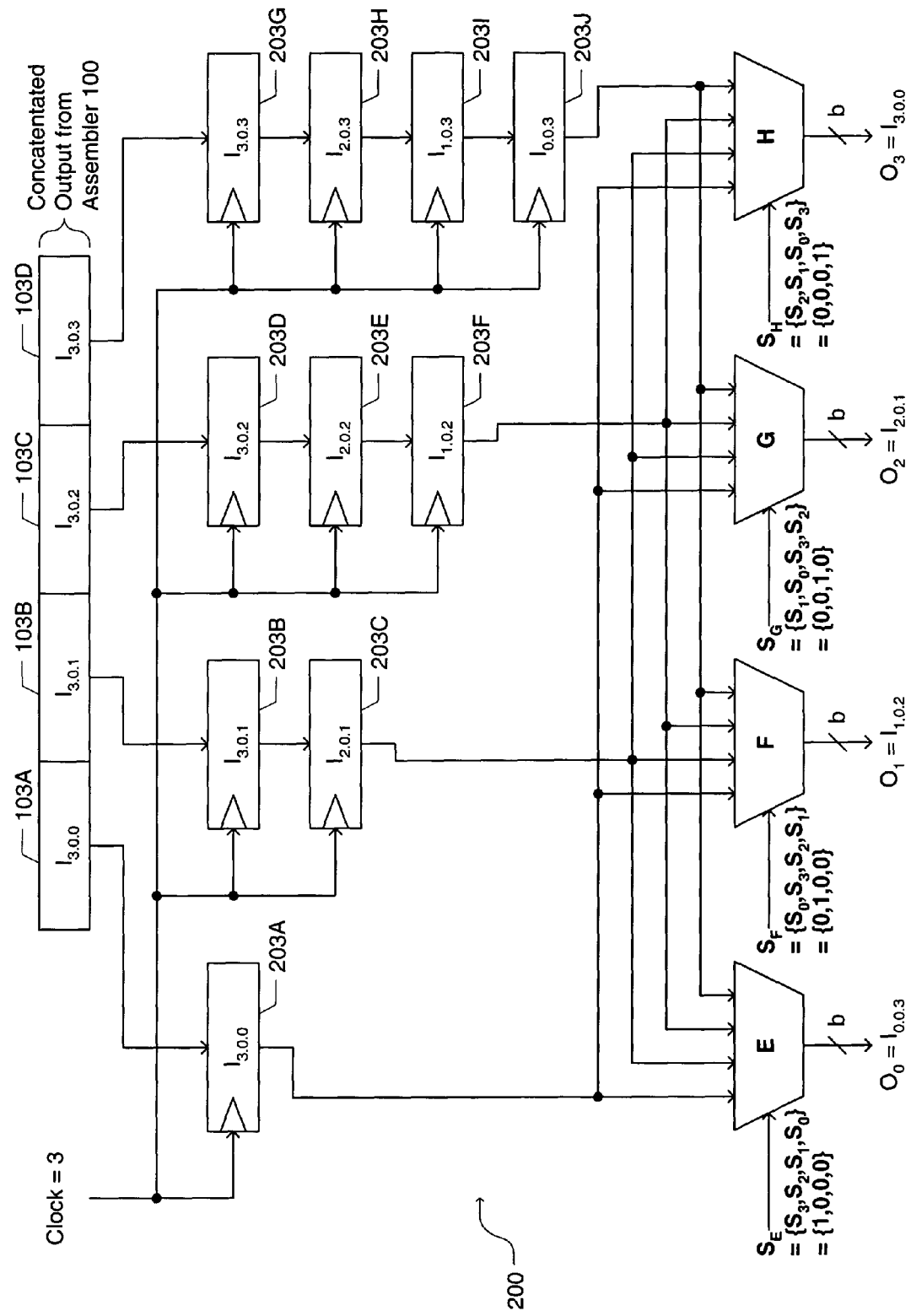
FIG. 18 is an illustration showing the disassembler at a clock cycle 3, in accordance with one embodiment of the present invention.

FIG. 18 is an illustration showing the disassembler 200 at a clock cycle 3, in accordance with one embodiment of the present invention. At clock cycle 3, the contents of cell 203B ($I_{2.0.1}$) are transmitted to the output of cell 203C. The contents of cell 203E ($I_{1.0.2}$) are transmitted to the output of cell 203F. The contents of cell 203D ($I_{2.0.2}$) are transmitted to the output of cell 203E. The contents of cell 2031 ($I_{0.0.3}$) are transmitted to the output of cell 203J. The contents of cell 203H ($I_{1.0.3}$) are transmitted to the output of cell 203I. The contents of cell 203G ($I_{2.0.3}$) are transmitted to the output of cell 203H.

Also, prior to the clock cycle 3, a next concatenated output from the assembler 100 is received at the input of the disassembler 200. Again, each part 103A, 103B, 103C, and 103D of the concatenated output is presented to the inputs of cells 203A, 203B, 203D, and 203G, respectively. The next concatenated output from the assembler 100 represents the first four portions of the $I_3$ data stream (i.e., $I_{3.0.0}$, $I_{3.0.1}$, $I_{3.0.2}$, and $I_{3.0.3}$). Therefore, at the clock cycle 3, $I_{3.0.0}$ is transmitted to the output of cell 203A, $I_{3.0.1}$ is transmitted to the output of cell 203B, $I_{3.0.2}$ is transmitted to the output of cell 203D, and $I_{3.0.3}$ is transmitted to the output of cell 203G.

Also at clock cycle 3, $S_E$ is {1000}. Therefore, during the clock cycle 3, MUX E propagates the contents of cell 203J ($I_{0.0.3}$) through to the output $O_0$. Also, at the clock cycle 3, $S_F$ is {0100}. Therefore, during the clock cycle 3, MUX F propagates the contents of cell 203F ($I_{1.0.2}$) through to the output $O_1$. Also, at the clock cycle 3, $S_G$ is {0010}. Therefore, during the clock cycle 3, MUX G propagates the contents of cell 203C ($I_{2.0.1}$) through to the output $O_2$. Also, at the clock cycle 3, $S_H$ is {0001}. Therefore, during the clock cycle 3, MUX H propagates the contents of cell 203A ($I_{3.0.0}$) through to the output $O_3$.

Figure 19:
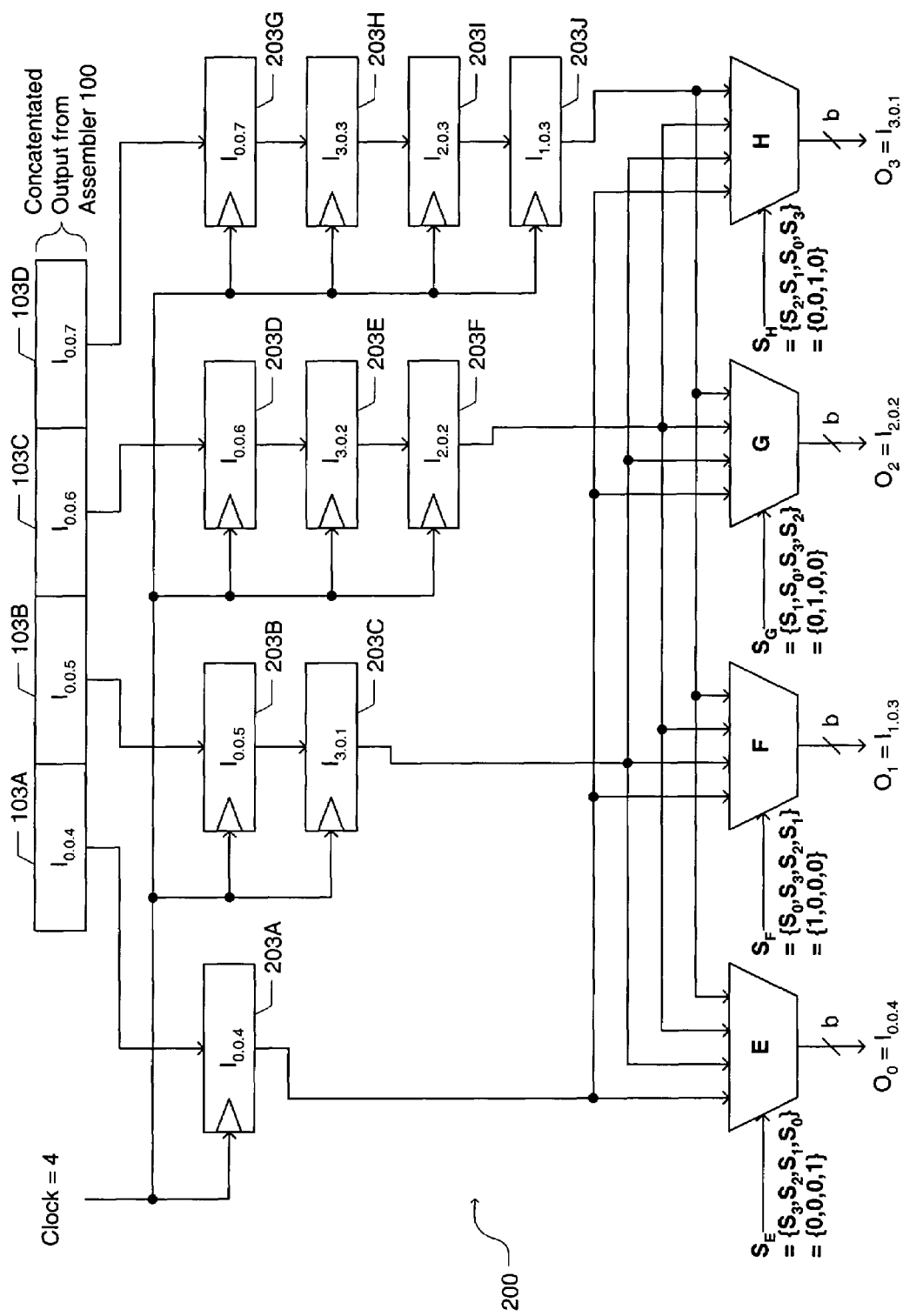
FIG. 19 is an illustration showing the disassembler at a clock cycle 4, in accordance with one embodiment of the present invention.

FIG. 19 is an illustration showing the disassembler 200 at a clock cycle 4, in accordance with one embodiment of the present invention. At clock cycle 4, the contents of cell 203B ($I_{3.0.1}$) are transmitted to the output of cell 203C. The contents of cell 203E ($I_{2.0.2}$) are transmitted to the output of cell 203F. The contents of cell 203D ($I_{3.0.2}$) are transmitted to the output of cell 203E. The contents of cell 2031 ($I_{1.0.3}$) are transmitted to the output of cell 203J. The contents of cell 203H ($I_{2.0.3}$) are transmitted to the output of cell 203I. The contents of cell 203G ($I_{3.0.3}$) are transmitted to the output of cell 203H.

Also, prior to the clock cycle 4, a next concatenated output from the assembler 100 is received at the input of the disassembler 200. Again, each part 103A, 103B, 103C, and 103D of the concatenated output is presented to the inputs of cells 203A, 203B, 203D, and 203G, respectively. The next concatenated output from the assembler 100 represents the next four portions of the $I_0$ data stream (i.e., $I_{0.0.4}$, $I_{0.0.5}$, $I_{0.0.6}$, and $I_{0.0.7}$). Therefore, at the clock cycle 4, $I_{0.0.4}$ is transmitted to the output of cell 203A, $I_{0.0.5}$ is transmitted to the output of cell 203B, $I_{0.0.6}$ is transmitted to the output of cell 203D, and $I_{0.0.7}$ is transmitted to the output of cell 203G.

Also at clock cycle 4, $S_E$ is {0001}. Therefore, during the clock cycle 4, MUX E propagates the contents of cell 203A ($I_{0.0.4}$) through to the output $O_0$. Also, at the clock cycle 4, $S_F$ is {1000}. Therefore, during the clock cycle 4, MUX F propagates the contents of cell 203J ($I_{1.0.3}$) through to the output $O_1$. Also, at the clock cycle 4, $S_G$ is {0100}. Therefore, during the clock cycle 4, MUX G propagates the contents of cell 203F ($I_{2.0.2}$) through to the output $O_2$. Also, at the clock cycle 4, $S_H$ is {0010}. Therefore, during the clock cycle 4, MUX H propagates the contents of cell 203C ($I_{3.0.1}$) through to the output $O_3$.

Figure 20:
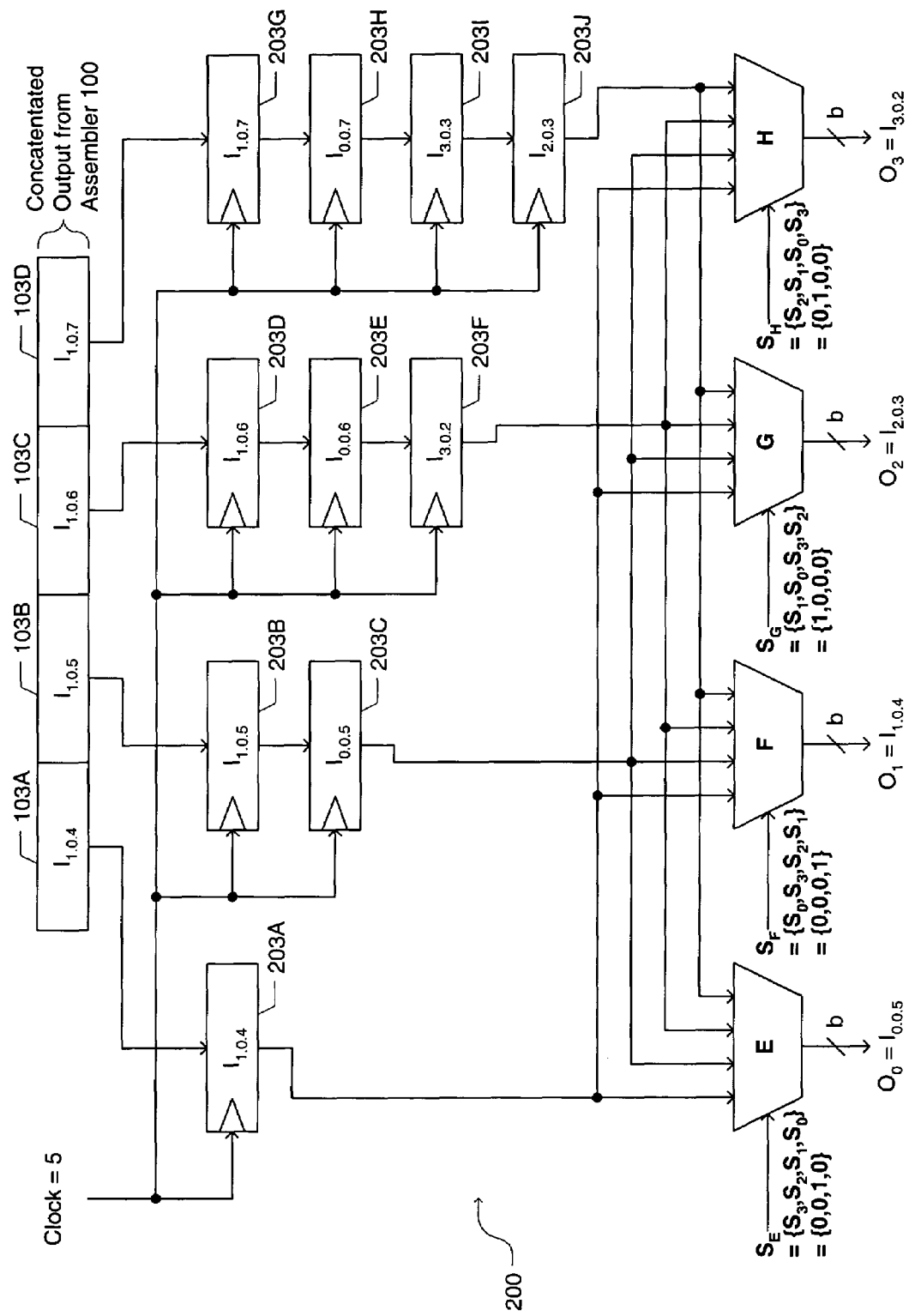
FIG. 20 is an illustration showing the disassembler at a clock cycle 5, in accordance with one embodiment of the present invention.

FIG. 20 is an illustration showing the disassembler 200 at a clock cycle 5, in accordance with one embodiment of the present invention. At clock cycle 5, the contents of cell 203B ($I_{0.0.5}$) are transmitted to the output of cell 203C. The contents of cell 203E ($I_{3.0.2}$) are transmitted to the output of cell 203F. The contents of cell 203D ($I_{0.0.6}$) are transmitted to the output of cell 203E. The contents of cell 203I ($I_{2.0.3}$) are transmitted to the output of cell 203J. The contents of cell 203H ($I_{3.0.3}$) are transmitted to the output of cell 203H. The contents of cell 203G ($I_{0.0.7}$) are transmitted to the output of cell 203H.

Also, prior to the clock cycle 5, a next concatenated output from the assembler 100 is received at the input of the disassembler 200. Again, each part 103A, 103B, 103C, and 103D of the concatenated output is presented to the inputs of cells 203A, 203B, 203D, and 203G, respectively. The next concatenated output from the assembler 100 represents the next four portions of the $I_1$ data stream (i.e., $I_{1.0.4}$, $I_{1.0.5}$, $I_{1.0.6}$, and $I_{1.0.7}$). Therefore, at the clock cycle 5, $I_{1.0.4}$ is transmitted to the output of cell 203A, $I_{1.0.5}$ is transmitted to the output of cell 203B, $I_{1.0.6}$ is transmitted to the output of cell 203D, and $I_{1.0.7}$ is transmitted to the output of cell 203G.

Also at clock cycle 5, $S_E$ is {0010}. Therefore, during the clock cycle 5, MUX E propagates the contents of cell 203C ($I_{0.0.5}$) through to the output $O_0$. Also, at the clock cycle 5, $S_F$ is {0001}. Therefore, during the clock cycle 5, MUX F propagates the contents of cell 203A ($I_{1.0.4}$) through to the output $O_1$. Also, at the clock cycle 5, $S_G$ is {1000}. Therefore, during the clock cycle 5, MUX G propagates the contents of cell 203J ($I_{2.0.3}$) through to the output $O_2$. Also, at the clock cycle 5, $S_H$ is {0100}. Therefore, during the clock cycle 5, MUX H propagates the contents of cell 203F ($I_{3.0.2}$) through to the output $O_3$.

As demonstrated by the example shown in FIGS. 13-20, the disassembler 200 and rotating selector 105 operate to disassemble the input, representing the concatenated output from the assembler 100, into data streams that are provided at the four outputs $O_0$, $O_1$, $O_2$, and $O_3$. The data stream provided at each of the four outputs $O_0$, $O_1$, $O_2$, and $O_3$ corresponds to each of the original data streams provided to the assembler 100 at each of the four inputs $I_0$, $I_1$, $I_2$, and $I_3$, respectively.

The input is provided to the disassembler 200 in the same order that the concatenated output is generated by the assembler 100. All parts of the input are simultaneously presented to the stepped arrangement of cells on each cycle of the clock. Each part of the input is distributed by the stepped arrangement of cells 203A-203J and the MUXs E, F, G, and H to provide a portion of each data stream, originally input to the assembler 100, to the outputs $O_0$, $O_1$, $O_2$, and $O_3$ on each clock cycle. When data is streaming into the disassembler 200, a new portion of each data stream originally input to the assembler 100 will be provided to a respective output on every clock cycle.

In one embodiment, once a data stream transmission is started at either the assembler 100 or disassembler 200 portions of the bandwidth matching device, the data stream transmission tends to continue for a while before an idle period is encountered. The tendency of the data stream transmission to continue is not a necessary condition of the present invention, but is a characteristic of data stream transmission that can be exploited by the present invention for better performance.

Both the assembler 100 and the disassembler 200 have been described in terms of an embodiment representing a 1× to 4× bandwidth matching device. In other embodiments, the assembler 100 and disassembler 200 can be defined to match bandwidths of different sizes. For example, the assembler 100 and disassembler 200 can be defined to provide a 1× to 2×, a 1× to 8×, a 1× to 16×, a 1× to 32×, or a 1× to 64×, bandwidth matching device, among others.

In the previously described embodiments, both the assembler 100 and the disassembler 200 have been presented as operating in conjunction with the rotating selector 105, as described with respect to FIG. 2. In other embodiments, alternative devices and techniques can be used to generate the selector signals for controlling each of the MUXs. The selector signals, however, need to ensure that the data received at the inputs of each MUX are steered sequentially to the output of each MUX in the manner previously described with respect to the assembler 100 and disassembler 200.

The assembler 100 and disassembler 200 of the bandwidth matching device of the present invention require fewer cells (i.e., registers) than used in previous bandwidth matching devices. Use of fewer cells as afforded by the present invention serves to decrease the size and overall footprint of the bandwidth matching device. Also, the assembler 100 and disassembler 200 of the bandwidth matching device of the present invention use smaller MUXs than used in previous bandwidth matching devices. Use of smaller MUXs as afforded by the present invention requires the convergence of fewer conduction paths into a common physical region. Therefore, use of smaller MUXs serves to distribute functionality and enhance placement and routing of the bandwidth matching device.

Figure 21:
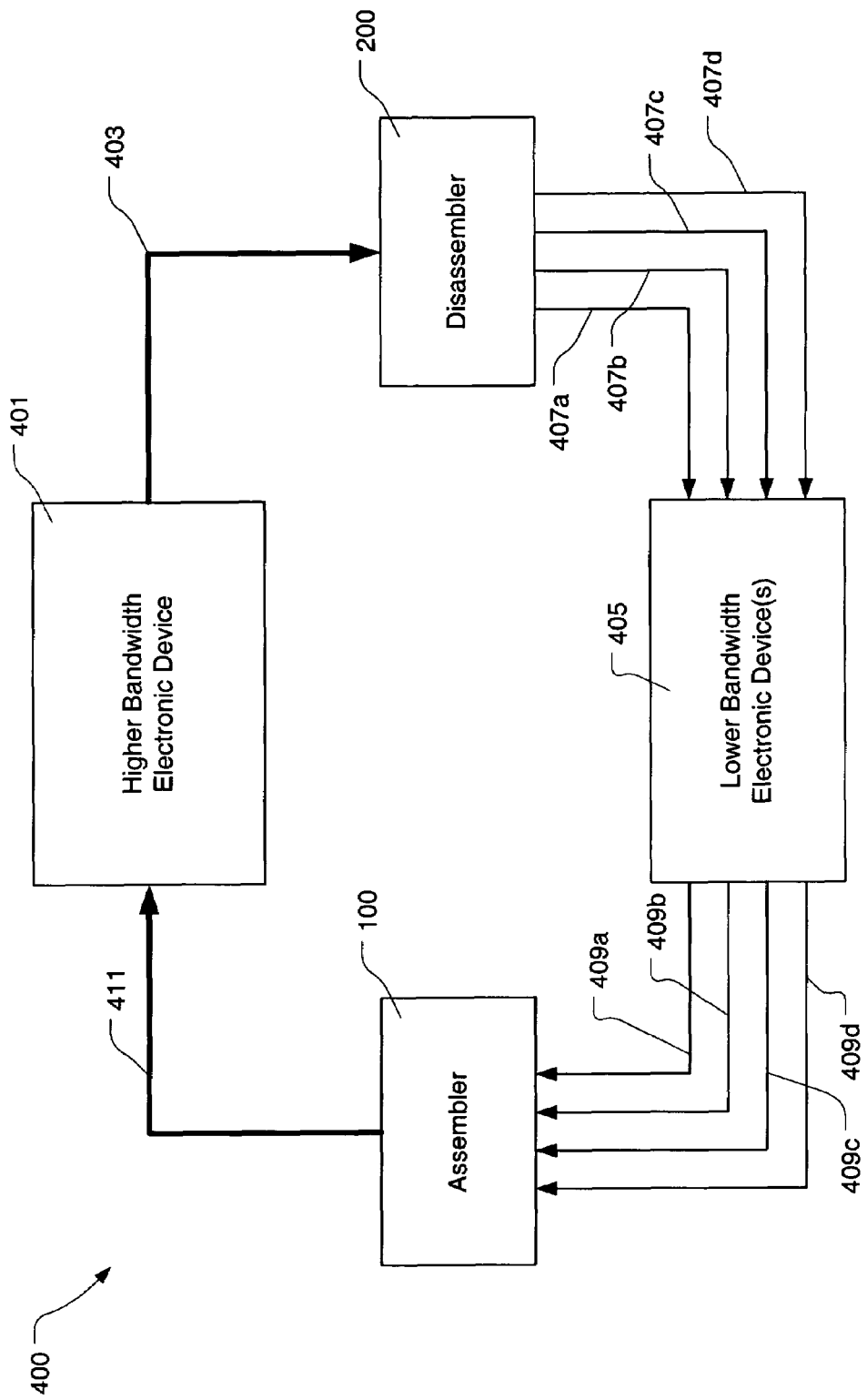
FIG. 21 is an illustration showing a high-level diagram of a system incorporating the assembler and the disassembler, in accordance with one embodiment of the present invention.

FIG. 21 is an illustration showing a high-level diagram of a system 400 incorporating the assembler 100 and the disassembler 200, in accordance with one embodiment of the present invention. The system 400 includes a higher bandwidth electronic device 401 and one or more lower bandwidth electronic devices 405. The disassembler 200 is incorporated to allow the higher bandwidth electronic device 401 to communicate with the lower bandwidth electronic devices 405. In the exemplary embodiment of FIG. 21, the higher bandwidth electronic device 401 operates at four times the bandwidth of the lower bandwidth electronic devices 405. However, in other embodiments different higher-to-lower bandwidth ratios can be accommodated.

The higher bandwidth electronic device 401 uses a high bandwidth connection 403 to communicate with the disassembler 200. The disassembler 200 disassembles a higher bandwidth transmission received from the higher bandwidth electronic device 401 into a number of lower bandwidth transmissions that are compatible with the lower bandwidth electronic devices 405. The disassembler 200 uses a number of lower bandwidth connections 407a-407d to communicate the number of lower bandwidth transmissions to the lower bandwidth electronic devices 405.

The assembler 100 is incorporated to allow the lower bandwidth electronic devices 405 to communicate with the higher bandwidth electronic device 401. The assembler 100 receives a number of lower bandwidth transmissions from the lower bandwidth electronic devices 405. The number of lower bandwidth transmissions are communicated to the assembler 100 through a number of lower bandwidth connections 409a-409d. The assembler 100 assembles the number of lower bandwidth transmissions into a higher bandwidth transmission that is compatible with the higher bandwidth electronic device 401. The assembled higher bandwidth transmission is communicated from the assembler 100 to the higher bandwidth electronic device 401 through a high bandwidth connection 411. Thus, in accordance with the foregoing, the disassembler 200 and assembler 100 can be implemented to facilitate communication between electronic devices of differing bandwidths.

Figure 22:
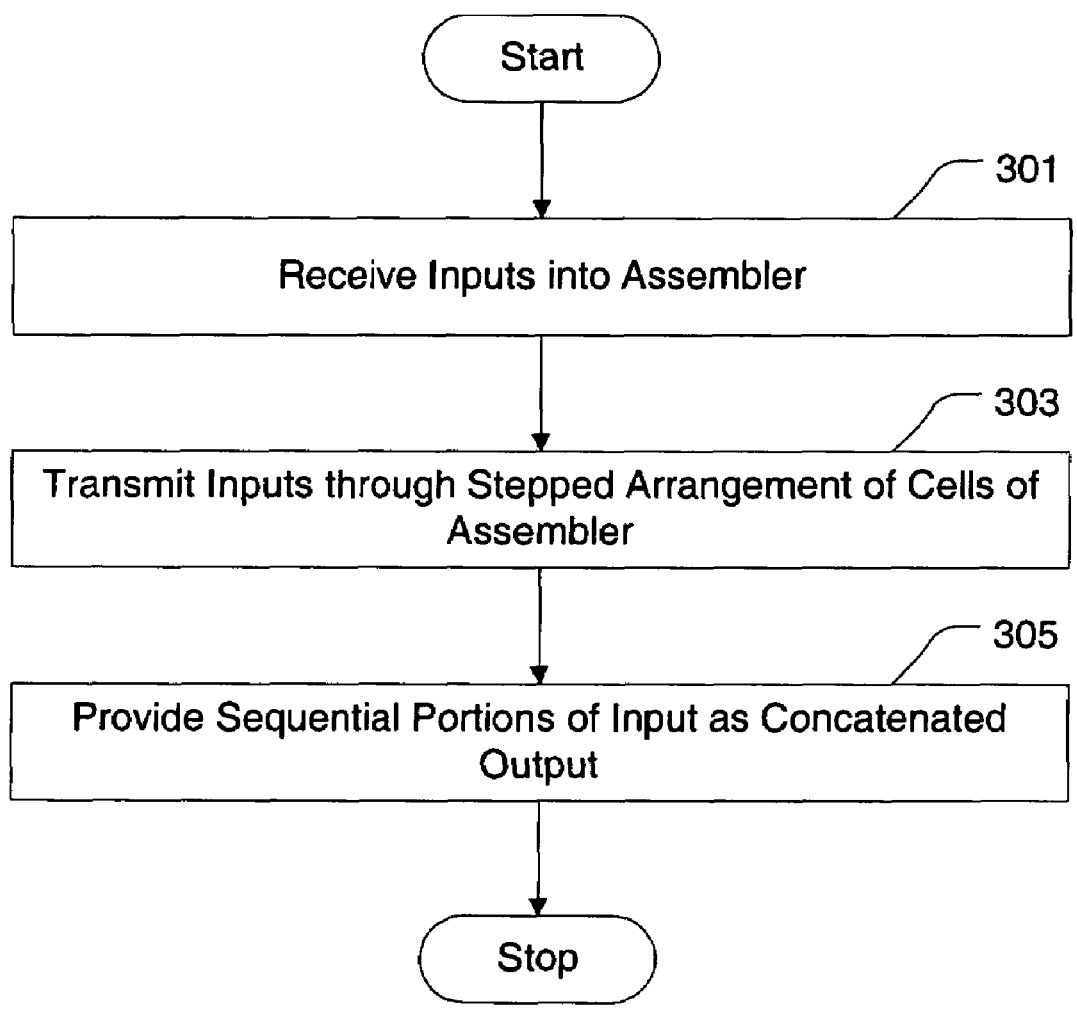
FIG. 22 shows a flowchart illustrating a method for operating a bandwidth matching device, in accordance with one embodiment of the present invention.

FIG. 22 shows a flowchart illustrating a method for operating a bandwidth matching device, in accordance with one embodiment of the present invention. The method includes an operation 301 in which a number of inputs are received into an assembler of the bandwidth matching device. In an operation 303, the number of inputs are transmitted through a stepped arrangement of cells of the assembler. The stepped arrangement of cells of the assembler functions as previously described with respect to the assembler 100. The method further includes an operation 305 in which sequential portions of one of the number of inputs are provided as a concatenated output from the stepped arrangement of cells of the assembler. Operations 301-305 of the method can be controlled using signals produced by a clock.

Figure 23:
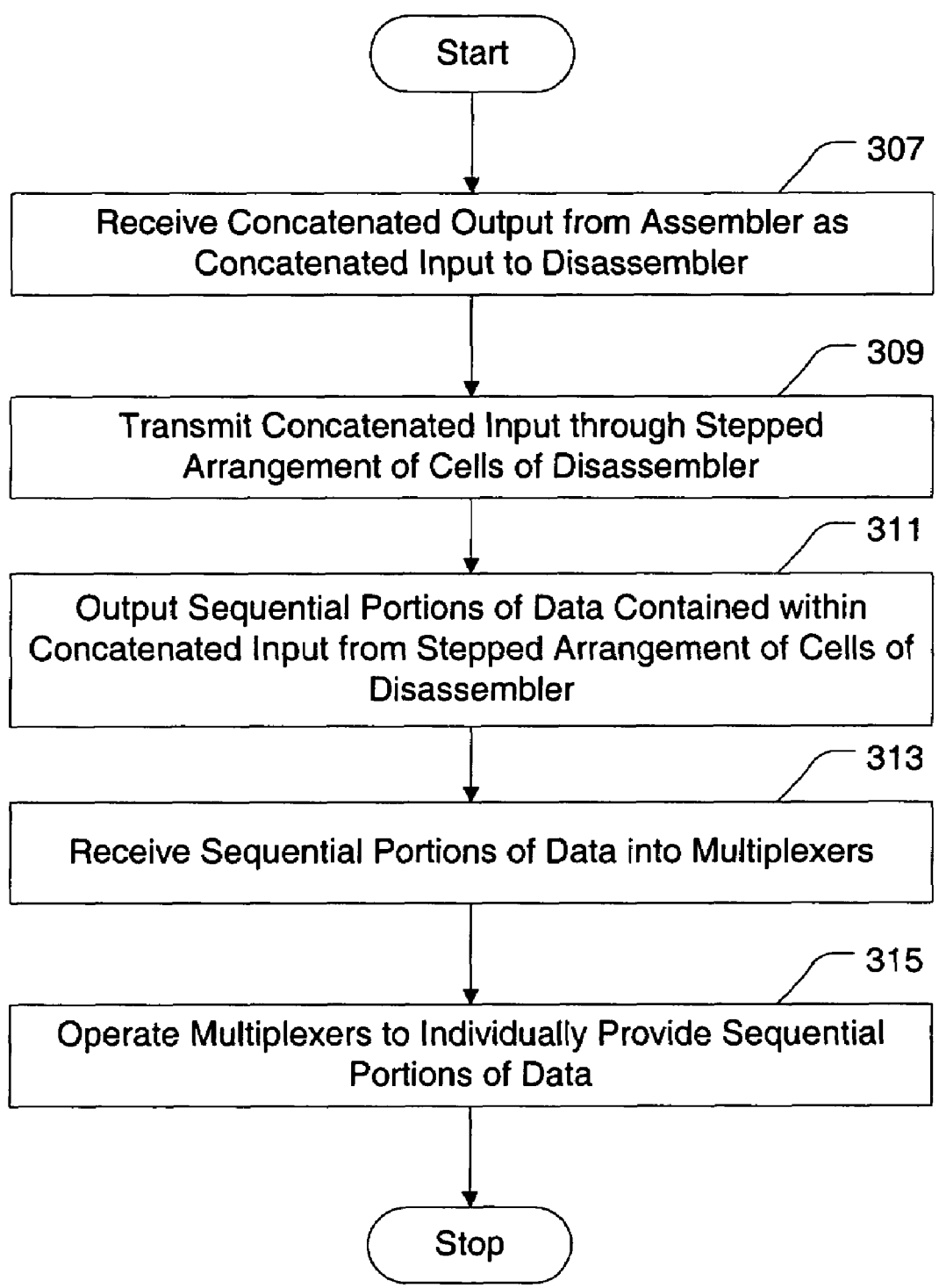
FIG. 23 shows a flowchart illustrating another method for operating a bandwidth matching device, in accordance with one embodiment of the present invention.

FIG. 23 shows a flowchart illustrating another method for operating a bandwidth matching device, in accordance with one embodiment of the present invention. In an operation 307, a concatenated output generated by the assembler is received as a concatenated input into the disassembler of the bandwidth matching device. In an operation 309, the concatenated input is transmitted through a stepped arrangement of cells of the disassembler. In an operation 311, the sequential portions of data contained within the concatenated input are output from the stepped arrangement of cells of the disassembler. In an operation 313, the sequential portions of data are received into a number of multiplexers. In an operation 315, the number of multiplexers are operated to individually provide the sequential portions of data contained within the concatenated input. The stepped arrangement of cells of the disassembler and the number of multiplexers of the disassembler function as previously described with respect to the disassembler 200. Operations 307-315 of the method can also be controlled using signals produced by a clock.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. An assembler of a bandwidth matching device, comprising:
   a plurality of inputs, each of the plurality of inputs having a first bandwidth;
   a plurality of multiplexers being equal in number to the plurality of inputs, each of the plurality of multiplexers being connected to receive the plurality of inputs and a selector signal, each of the plurality of multiplexers having a multiplexer output; and
   one or more serially connected cells being connected to the multiplexer output of each of the plurality of multiplexers, the one or more serially connected cells forming a stepped arrangement of cells, the stepped arrangement of cells being defined to generate a concatenated output representing a concatenated version of one of the plurality of inputs on a cycle of a clock, the concatenated output having a second bandwidth that is larger than the first bandwidth.

2. An assembler of a bandwidth matching device as recited in claim 1, wherein each of the plurality of multiplexers is connected to receive a different selector signal in each cycle of the clock, the different selector signal being defined to control which of the plurality of inputs received by the multiplexer is to be transmitted to the multiplexer output.

3. An assembler of a bandwidth matching device as recited in claim 2, wherein the selector signal to be received by each of the plurality of multiplexers is defined by a sequence of single bit signals being equal in number to the plurality of inputs.

4. An assembler of a bandwidth matching device as recited in claim 3, further comprising:
   a rotating selector for generating the single bit signals sequenced to define the selector signal, the rotating selector signal causing one of the single bit signals to have a first digital state and a remainder of the single bit signals to have a second digital state in the given clock cycle, the rotating selector causing a different one of the single bit signals to have the first digital state on successive clock cycles such that the first digital state rotates in a defined sequence among the single bit signals on successive clock cycles.

5. An assembler of a bandwidth matching device as recited in claim 1, wherein the stepped arrangement of cells is defined by decreasing a number of cells in each of the one or more serially connected cells by one cell between adjacent multiplexers.

6. An assembler of a bandwidth matching device as recited in claim 5, wherein a last cell in each of the one or more serially connected cells defining the stepped arrangement of cells is connected to provide a portion of the concatenated output on each cycle of the clock, adjacent last cells within the stepped arrangement of cells providing sequential portions of one of the plurality of inputs to adjacent portions of the concatenated output on each cycle of the clock.

7. An assembler of a bandwidth matching device as recited in claim 6, wherein a number of portions defining the concatenated output is equal to the number of the plurality of inputs.

8. An assembler of a bandwidth matching device as recited in claim 1, wherein the second bandwidth of the concatenated output is equal to the first bandwidth of each of the plurality of inputs multiplied by the number of the plurality of inputs.

9. An assembler of a bandwidth matching device as recited in claim 1, wherein each cell in the stepped arrangement of cells is a flip-flop device.

10. An assembler of a bandwidth matching device as recited in claim 1, wherein the concatenated output corresponds to a different one of the plurality of inputs on successive cycles of the clock.

11. A disassembler of a bandwidth matching device, comprising:
    an input representing a concatenation of a plurality of data packets;
    a plurality of cells, each of the plurality of cells being connected to receive one of the plurality of data packets, some of the plurality of cells being serially connected to a number of additional cells to form a stepped arrangement of cells, the stepped arrangement of cells being defined to provide each of the plurality of data packets in a sequenced manner; and
    a plurality of multiplexers, each of the plurality of multiplexers being connected to receive the plurality of data packets provided by the stepped arrangement of cells in the sequenced manner, each of the plurality of multiplexers being further connected to receive a selector signal, each of the plurality of multiplexers being defined to provide an output sequence of data packets on successive cycles of a clock, the output sequence of data packets representing an unconcatenated sequence of the concatenation of the plurality of data packets.

12. A disassembler of a bandwidth matching device as recited in claim 11, wherein the stepped arrangement of cells is defined by increasing the number of additional cells serially connected to some of the plurality of cells by one cell between adjacent cells of the plurality of cells.

13. A disassembler of a bandwidth matching device as recited in claim 12, wherein a number of cells in the stepped arrangement of cells each provide a data packet from the plurality of data packets represented by the input to each of the plurality of multiplexers on each cycle of the clock.

14. A disassembler of a bandwidth matching device as recited in claim 11, wherein each of the plurality of multiplexers is connected to receive a different selector signal in each cycle of the clock, the different selector signal being defined to control which of the plurality of data packets received by the multiplexer is to be provided as part of the output sequence of data packets.

15. A disassembler of a bandwidth matching device as recited in claim 14, wherein the selector signal to be received by each of the plurality of multiplexers is defined by a sequence of single bit signals being equal in number to the plurality of data packets received from the stepped arrangement of cells on each cycle of the clock.

16. A disassembler of a bandwidth matching device as recited in claim 15, further comprising:

a rotating selector for generating the single bit signals sequenced to define the selector signal, the rotating selector signal causing one of the single bit signals to have a first digital state and a remainder of the single bit signals to have a second digital state in the given clock cycle, the rotating selector causing a different one of the single bit signals to have the first digital state on successive clock cycles such that the first digital state rotates in a defined sequence among the single bit signals on successive clock cycles.

17. A disassembler of a bandwidth matching device as recited in claim 11, wherein each cell in the stepped arrangement of cells is a flip-flop device.

18. A method for operating a bandwidth matching device, comprising:

receiving a number of inputs into an assembler;

transmitting the number of inputs through a stepped arrangement of cells of the assembler; and outputting sequential portions of one of the number of inputs from the stepped arrangement of cells of the assembler to provide a concatenated output containing the sequential portions.

19. A method for operating a bandwidth matching device as recited in claim 18, further comprising:

operating a clock to produce signals for controlling the receiving of the number of inputs into the assembler, the transmitting of the number of inputs through the stepped arrangement of cells of the assembler, and the outputting of sequential portions of one of the number of inputs from the stepped arrangement of cells of the assembler.

20. A method for operating a bandwidth matching device as recited in claim 18, further comprising:

receiving a concatenated input into a disassembler, the concatenated input containing sequential portions of data;

transmitting the concatenated input through a stepped arrangement of cells of the disassembler;

outputting the sequential portions of data from the stepped arrangement of cells of the disassembler;

receiving the sequential portions of data into a number of multiplexers; and operating the number of multiplexers to individually provide the sequential portions of data contained within the concatenated input.

21. A method for operating a bandwidth matching device as recited in claim 20, further comprising:

operating a clock to produce signals for controlling the receiving of the concatenated input into the disassembler, the transmitting of the concatenated input through the stepped arrangement of cells of the disassembler, the outputting of the sequential portions of data from the stepped arrangement of cells of the disassembler, the receiving of the sequential portions of data into the number of multiplexers, and the operating of the number of multiplexers to individually provide the sequential portions of data contained within the concatenated input.

22. A device, comprising:

a plurality of inputs, each of the plurality of inputs having a first bandwidth;

a plurality of multiplexers equal in number to the plurality of inputs, each multiplexer coupled to receive the plurality of inputs and a selector signal, each multiplexer having a respective multiplexer output; and a plurality of cells coupled to receive the multiplexer outputs and a clock signal, the plurality of cells to generate a cell output representing a concatenated version of a different one of the plurality of inputs in relation to a cycle of the clock signal, the cell output having a second bandwidth greater than the first bandwidth, the plurality of cells including one or more cells coupled in series in a respective path from each respective multiplexer output to the cell output, a number of cells in each path differing by one from a next sequential path.

* * * * *